US010329171B2

(12) United States Patent
Henthorne

(10) Patent No.: US 10,329,171 B2
(45) Date of Patent: *Jun. 25, 2019

(54) METHOD AND CONTROL DEVICES FOR PRODUCTION OF CONSISTENT WATER QUALITY FROM MEMBRANE-BASED WATER TREATMENT FOR USE IN IMPROVED HYDROCARBON RECOVERY OPERATIONS

(71) Applicant: Water Standard Company (MI), Majuro (MH)

(72) Inventor: Lisa Henthorne, Tampa, FL (US)

(73) Assignee: Water Standard Company (MI), Majuro (MH)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,259

(22) Filed: Feb. 14, 2013

(65) Prior Publication Data

US 2013/0213892 A1 Aug. 22, 2013

Related U.S. Application Data

(63) Continuation-in-part of application No. 13/335,340, filed on Dec. 22, 2011.

(51) Int. Cl.
*C02F 1/44* (2006.01)
*E21B 43/20* (2006.01)
(Continued)

(52) U.S. Cl.
CPC .............. *C02F 1/44* (2013.01); *B01D 61/022* (2013.01); *B01D 61/025* (2013.01);
(Continued)

(58) Field of Classification Search
None
See application file for complete search history.

(56) References Cited

U.S. PATENT DOCUMENTS 3,171,799 A 3/1965 Batchelder
3,992,301 A 11/1976 Shippey et al.
(Continued)

FOREIGN PATENT DOCUMENTS

CN 1507417 A 6/2004
CN 1714048 A 12/2005
(Continued)

OTHER PUBLICATIONS

Positive Displacement Pumps. The Engineering Toolbox. Accessed on Feb. 6, 2017 from http://www.engineeringtoolbox.com/positive-displacement-pumps.*
(Continued)

*Primary Examiner* — Kara M Peo
(74) *Attorney, Agent, or Firm* — Osha Liang LLP

(57) ABSTRACT

A method for treating water including intaking a first amount of water from a first source into a plurality of treatment blocks, treating the first amount of water, outputting aqueous treated water streams from each of the plurality of treatment blocks, separating the aqueous treated water streams from each of the plurality of treatment blocks into aqueous permeate streams and concentrate reject streams, monitoring each of the aqueous permeate streams, controlling the operation of at least one of the plurality of treatment blocks based on predefined water-characteristic tolerances that fall within a predetermined concentration range based on the different qualities of the aqueous permeate streams, outputting a product water stream into an injection water reservoir or blend point, the product water stream including the aqueous permeate stream, intaking a second amount of water from a second source, treating the second amount of water, and discharging the dischargeable water stream.

15 Claims, 16 Drawing Sheets

(51) Int. Cl.

| | |
|---|---|
| *E21B 41/00* | (2006.01) |
| *E21B 43/08* | (2006.01) |
| *C02F 1/00* | (2006.01) |
| *B01D 61/02* | (2006.01) |
| *B01D 61/12* | (2006.01) |
| *B01D 63/12* | (2006.01) |
| *C02F 103/08* | (2006.01) |
| *C02F 103/36* | (2006.01) |

(52) U.S. Cl.
CPC .......... *B01D 61/027* (2013.01); *B01D 61/12* (2013.01); *B01D 63/12* (2013.01); *C02F 1/008* (2013.01); *C02F 1/441* (2013.01); *C02F 1/442* (2013.01); *E21B 41/005* (2013.01); *E21B 43/08* (2013.01); *E21B 43/20* (2013.01); *B01D 2311/04* (2013.01); *B01D 2311/246* (2013.01); *B01D 2313/243* (2013.01); *B01D 2313/246* (2013.01); *B01D 2317/04* (2013.01); *B01D 2319/02* (2013.01); *B01D 2319/06* (2013.01); *C02F 2103/08* (2013.01); *C02F 2103/365* (2013.01); *C02F 2209/005* (2013.01); *C02F 2209/05* (2013.01); *C02F 2209/055* (2013.01); *C02F 2209/10* (2013.01); *C02F 2209/40* (2013.01)

(56) References Cited

U.S. PATENT DOCUMENTS

| | | | |
|---|---|---|---|
| 4,046,685 A | 9/1977 | Bray | |
| 4,366,063 A | 12/1982 | O'Connor | |
| 4,723,603 A | 2/1988 | Plummer | |
| 5,076,934 A | 12/1991 | Fenton | |
| 5,266,202 A * | 11/1993 | Okonogi | A23C 9/1427 210/637 |
| 5,460,723 A | 10/1995 | Bourbigot et al. | |
| 5,501,798 A | 3/1996 | Al-Samadi et al. | |
| 5,670,053 A | 9/1997 | Collentro et al. | |
| 5,725,758 A | 3/1998 | Chace et al. | |
| 5,916,441 A | 6/1999 | Raether | |
| 6,027,649 A | 2/2000 | Benedek et al. | |
| 6,030,535 A | 2/2000 | Hayashi et al. | |
| 6,074,551 A | 6/2000 | Jones et al. | |
| 6,190,556 B1 | 2/2001 | Uhlinger | |
| 6,190,558 B1 | 2/2001 | Robbins | |
| 6,436,281 B2 | 8/2002 | Hammer et al. | |
| 6,783,682 B1 | 8/2004 | Awerbuch | |
| 6,797,173 B1 | 9/2004 | Oklejas, Jr. | |
| 6,824,695 B2 | 11/2004 | Tempest, Jr. | |
| 6,838,001 B2 | 1/2005 | Zeiher et al. | |
| 7,169,236 B2 | 1/2007 | Zeiher et al. | |
| 7,392,848 B1 | 7/2008 | Bader | |
| 7,410,581 B2 | 8/2008 | Arnold et al. | |
| 7,455,109 B2 | 11/2008 | Collins | |
| 7,470,366 B2 | 12/2008 | Queen et al. | |
| 7,501,064 B2 | 3/2009 | Schmidt et al. | |
| 7,600,567 B2 | 10/2009 | Christopher et al. | |
| 7,628,921 B2 | 12/2009 | Efraty | |
| 7,726,398 B2 | 6/2010 | Collins et al. | |
| 7,727,400 B2 | 6/2010 | Flynn | |
| 8,070,953 B2 | 12/2011 | Ito et al. | |
| 2002/0108900 A1 | 8/2002 | Hirose et al. | |
| 2004/0065614 A1 | 4/2004 | Gordon et al. | |
| 2005/0029192 A1 | 2/2005 | Arnold et al. | |
| 2006/0157410 A1 | 7/2006 | Hassan | |
| 2007/0045189 A1 | 3/2007 | Lichtner et al. | |
| 2007/0068871 A1 | 3/2007 | Flynn | |
| 2007/0181497 A1 | 8/2007 | Liberman | |
| 2008/0105617 A1 | 5/2008 | Oklejas | |
| 2008/0156731 A1 | 7/2008 | Gordon | |
| 2009/0050320 A1 | 2/2009 | Collins et al. | |
| 2009/0194272 A1 * | 8/2009 | Baillie | 166/90.1 |
| 2010/0089809 A1 | 4/2010 | Bridle et al. | |
| 2010/0187128 A1 | 7/2010 | Neubert et al. | |
| 2010/0212319 A1 | 8/2010 | Donovan | |
| 2010/0218946 A1 | 9/2010 | Symington et al. | |
| 2011/0035195 A1 | 2/2011 | Subbiah et al. | |
| 2011/0147309 A1 | 6/2011 | Palacios Donaque et al. | |
| 2011/0315612 A1 | 12/2011 | Kakigami et al. | |
| 2011/0315631 A1 | 12/2011 | Al-Samadi | |
| 2012/0067820 A1 | 3/2012 | Henthorne et al. | |

FOREIGN PATENT DOCUMENTS

| | | |
|---|---|---|
| WO | 2004033373 A2 | 4/2004 |
| WO | 2007138327 A1 | 12/2007 |
| WO | 2010022726 A1 | 3/2010 |
| WO | 2010120806 A2 | 10/2010 |
| WO | 2010139773 A1 | 12/2010 |
| WO | 2011053794 A2 | 5/2011 |
| WO | 2011086346 A1 | 7/2011 |

OTHER PUBLICATIONS

International Search Report issued in PCT/US2011/052461 dated Feb. 27, 2012 (10 pages).
International Search Report issued PCT/US2012/068081 dated Mar. 14, 2013 (10 pages).
International Search Report in corresponding International Application No. PCT/US2014/016465 dated Jun. 25, 2014 (4 pages).
Written Opinion of the International Searching Authority in corresponding International Application No. PCT/US2014/016465 dated Jun. 25, 2014 (4 pages).
International Preliminary Report on Patentability in corresponding International Application No. PCT/US2012/068081 dated Jun. 24, 2014 (5 pages).
Office Action in corresponding U.S. Appl. No. 13/335,340 dated May 21, 2014 (25 pages).
Patent Examination Report No. 1 in corresponding Australian Application No. 2012355684 dated Jun. 29, 2015 (4 pages).
First Examiner's Report issued in the corresponding Canadian Patent Application No. 2860101, dated Jul. 20, 2015 (6 pages).
International Preliminary Report on Patentability issued in the corresponding International Application No. PCT/US2014/016465, dated Aug. 27, 2015 (6 pages).
Extended European Search Report issued in the counterpart European Patent Application No. 12859227.6, dated Nov. 18, 2015 (9 pages).
Office Action issued in corresponding U.S. Appl. No. 13/335,340, dated Mar. 2, 2018 (17 pages).

* cited by examiner

METHOD AND CONTROL DEVICES FOR PRODUCTION OF CONSISTENT WATER QUALITY FROM MEMBRANE-BASED WATER TREATMENT FOR USE IN IMPROVED HYDROCARBON RECOVERY OPERATIONS

BACKGROUND

Field of the Invention

Embodiments disclosed herein relate generally to methods and control devices for production of consistent water quality from membrane-based water treatment for use in improved hydrocarbon recovery operations.

Background Art

Hydrocarbons accumulated within a subterranean hydrocarbon-bearing formation are recovered or produced therefrom through production wells drilled into the subterranean formation. When production of hydrocarbons slows, improved recovery techniques may be used to force the hydrocarbons out of the formation. One of the simplest methods of forcing the hydrocarbons out of the formation is by direct injection of fluid into the formation. This enhances production by displacing or sweeping hydrocarbons through the formation so that they may be produced from production well(s).

As shown in FIG. 1, a prior art system for recovering hydrocarbons from a formation consists of an offshore rig 12 connected to a well 10, which is completed in a subterranean hydrocarbon-bearing formation 14. Generally, fluid is injected directly into the subterranean hydrocarbon-bearing formation 14 (indicated by the down arrow) and forces the hydrocarbons through the formation and out of the well 10 (indicated by the up arrow) via a production well, which may be the same or a different well. One type of such recovery operation uses water (e.g., seawater, produced water) as the injection fluid, which is referred to as a waterflood. Water is injected, under pressure, into the formation via injection wells, driving the hydrocarbons through the formation toward production wells.

Injection water used in waterflooding for offshore wells is typically seawater and/or produced water because of the low-cost availability of seawater and/or produced water at offshore locations. Another motivation for using produced water as an injection water offshore is the difficulty in some locations in disposing the produced water offshore. In any case, seawater and produced water are generally characterized as saline, having a high ionic content relative to fresh water. For example, the fluids are rich in sodium, chloride, sulfate, magnesium, potassium, and calcium ions, to name a few. Some ions present in injection water can benefit hydrocarbon production. For example, certain combinations of cations and anions, including $K^+$, $Na^+$, $Cl^-$, $Br^-$, and $OH^-$, can stabilize clay to varying degrees in a formation susceptible to clay damage from swelling or particle migration.

However, it has also been found that certain ions, including calcium and/or sulfate, present in the injection water may have harmful effects on the injection wells and production wells and can ultimately diminish the amount or quality of the hydrocarbon product produced from the production wells. Specifically, sulfate ions can form salts in situ when contacted with metal cations such as barium and/or strontium, which may be naturally occurring in the reservoir. Barium and strontium sulfate salts are relatively insoluble and readily precipitate out of solution under ambient reservoir conditions. Solubility of the salts further decreases as the injection water is produced to the surface with the hydrocarbons because of temperature decreases in the production well. The resulting precipitates accumulate as barium sulfate scale in the outlying reservoir, at the wellbore of the hydrocarbon production wells, and downstream thereof (e.g., in flow lines, gas/liquid separators, transportation pipelines, etc). The scale reduces the permeability of the reservoir and reduces the diameter of perforations in wellbores, thereby diminishing hydrocarbon recovery from the hydrocarbon production wells. Divalent cations are particularly effective at stablizing sensitive clays.

It has also been reported that a significant concentration of sulfate ions in injection water promotes reservoir souring. Reservoir souring is an undesirable phenomenon whereby reservoirs are initially sweet upon discovery, but turn sour during the course of waterflooding and attendant hydrocarbon production from the reservoir. Souring contaminates the reservoir with hydrogen sulfide gas or other sulfur-containing species and is evidenced by the production of quantities of hydrogen sulfide gas along with the desired hydrocarbon fluids from the reservoir via the hydrocarbon production wells. The hydrogen sulfide gas causes a number of undesired consequences at the hydrocarbon production wells and downstream of the wells, including excessive degradation and corrosion of the hydrocarbon production well metallurgy and associated production equipment, diminished economic value of the produced hydrocarbon fluids, an environmental hazard to the surroundings, and a health hazard to field personnel.

The hydrogen sulfide is believed to be produced by an anaerobic sulfate-reducing bacteria. The sulfate-reducing bacteria is often indigenous to the reservoir and is also commonly present in the injection water. Sulfate ions and organic carbon are the primary feed reactants used by the sulfate reducing bacteria to produce hydrogen sulfide in situ. The injection water is usually a plentiful source of sulfate ions, while formation water is a plentiful source of organic carbon in the form of naturally-occurring low molecular weight fatty acids. The sulfate reducing bacteria effects reservoir souring by metabolizing the low molecular weight fatty acids in the presence of the sulfate ions, thereby reducing the sulfate to hydrogen sulfide. Stated alternatively, reservoir souring is a reaction carried out by the sulfate reducing bacteria which converts sulfate and organic carbon to hydrogen sulfide and byproducts.

A number of strategies have been employed in the prior art for remediating reservoir souring with limited effectiveness. These prior art strategies have primarily been single pronged attacks against either the sulfate reducing bacteria itself or against a specific food nutrient of the sulfate reducing bacteria. For example, many prior art strategies have focused on killing the sulfate reducing bacteria in the injection water or within the reservoir. Conventional methods for killing the sulfate reducing bacteria or limiting their growth may include ultraviolet light, biocides, and chemicals such as acrolein and nitrates. Other prior art strategies for remediating reservoir souring have focused on limiting the availability of sulfates or organic carbon to the sulfate reducing bacteria.

More recently, strategies for remediating reservoir souring have included the use of membranes to reduce the concentration of sulfate ions in injection water. For example, U.S. Pat. No. 4,723,603 shows that specific membranes can effectively reduce the concentration of sulfate ions in injection water, thereby inhibiting sulfate scale formation. As taught by the prior art, nanofiltration (NF) membranes are often preferred to reverse osmosis (RO) membranes because nanofiltration membranes generally permit a higher passage of sodium chloride compared to reverse osmosis membranes. Consequently, nanofiltration membranes are advantageously operable at substantially lower pressures and operating costs than reverse osmosis membranes. Furthermore, nanofiltration membranes also maintain the ionic strength of the resulting injection water at a relatively high level, which desirably reduces the risk of clay instability and correspondingly reduces the risk of water permeability loss through the porous substrata of the subterranean formation.

However, in addition to the problems associated with sulfate ions being present in the injection water, it has also been found that the salinity of an injection water can have a major impact on the recovery of hydrocarbons during waterfloods, with increased recovery resulting from the use of injection water of lower salinity than natural seawater but sufficient ionic strength to prevent clay instability. Depending on the type of formation, injection fluids having higher salinity may cause the reservoir wettability to become more oilwet. This is because the multivalent cations in the brine, such as $Ca^{+2}$ and $Mg^{+2}$, are believed to act like bridges between the negatively charged oil and the negatively charged clay minerals that typically line the pore walls of the formation. The oil reacts with the clay particles to form organometallic complexes, which results in the clay surface being extremely hydrophobic and oilwet. As the oilwetness of the reservoir rock increases, hydrocarbons will adsorb onto the surface of the rock and thereby flow less easily from the formation, relative to water, which results in less hydrocarbon product being produced.

Lowering the electrolyte content (i.e., lowering the ionic strength) by lowering the overall salinity and especially reducing the concentration of multivalent cations in the formation reduces the screening potential of the cations. This results in increased electrostatic repulsion between the clay particles and the oil. Once the repulsive forces exceed the binding forces via the multivalent cation bridges, the oil particles are desorbed from the clay surfaces and the clay surfaces become increasingly waterwet. If, however, the electrolyte content is reduced too much (i.e., the formation fluid salinity is too low), the clay particles may be stripped from the pore walls (clay deflocculation), which will damage the formation. Thus, although it is desirable to have lower salinity injection water, it is important that the salinity levels be kept within a specified range.

Lower salinity water, however, is not often available at a well site. Lower salinity water is typically prepared, for example, by reducing the total ion concentration of higher salinity water using membrane separation technology (e.g., reverse osmosis). In known seawater desalination plants operating according to the reverse osmosis process, the seawater to be desalinated is subjected to a separation process by means of a semi-permeable membrane. Such a membrane is understood to be a selective membrane, which is permeable to a high degree to the water molecules, but only to a very low extent to the salt ions dissolved therein.

Membrane separation techniques used in the preparation of low salinity injection water use reverse osmosis (RO) membrane elements. Membrane separation techniques used in the preparation of low sulfate injection water and softened water use specialized nanofiltration (NF) membrane elements. The RO and NF processes use hydraulic pressure to produce lower salinity water from feed water through a semipermeable membrane. Depending on the membrane type, pressure and water conditions, an amount of salt also passes across the membrane, but the overall salinity of the product water is less than that of the feed water. Current RO technology can be used for desalinating both seawater and brackish water. The membranes used in the RO process are generally either made from polyamides or from cellulose sources.

The water to be treated is typically pretreated using cartridge filters, media filtration, microfiltration, or ultrafiltration methods, which are known to separate solids/particulates from the water based on their size. The water is then fed to the reverse osmosis and/or nanofiltration vessel using a high-pressure pump. The required pressure from the high-pressure pump is a function of the osmotic pressure, the temperature, the flux (i.e., the rate at which the water passes through a unit area of the membrane), and the volume of the feed water to be produced with a specific membrane area. The product water (i.e., the permeate) is discharged from the membrane module by way of a permeate conduit. A concentrate conduit serves for discharging concentrated ionic water.

Typically, conventional systems are only concerned with producing water having certain characteristics in amounts higher or lower than a predetermined level. Such systems focus only on a maximum allowable limit of a contaminant and treatment occurs as long as, and only if, the amount of the particular characteristic is above the set limit. Otherwise, the water is deemed acceptable for use. Most often, such a treatment plant will include several treatment blocks connected in series and/or parallel. In such systems, water is passed through as many of the multiple blocks, or through a particular block as many times, as is necessary for the particular characteristic in the water to reach the amount deemed acceptable for use.

SUMMARY

In one aspect, embodiments disclosed herein relate to a method for treating seawater or other water sources for injection, the method including intaking a first amount of water from a first source into a plurality of treatment blocks, treating the first amount of water, outputting aqueous treated water streams from each of the plurality of treatment blocks, separating the aqueous treated water streams from each of the plurality of treatment blocks into aqueous permeate streams and concentrate reject streams, monitoring each of the aqueous permeate streams, controlling the operation of at least one of the plurality of treatment blocks based on predefined water-characteristic tolerances that fall within a predetermined concentration range based on the different qualities of the aqueous permeate streams, outputting a product water stream into an injection water reservoir or blend point, the product water stream comprising the aqueous permeate stream, intaking a second amount of water from a second source into a produced water reservoir, treating the second amount of water, and discharging the dischargeable water stream. Treating the first amount of water includes pumping at least a portion of the first amount of water through the plurality of treatment blocks. The monitoring includes identifying different characteristics of the aqueous permeate streams. Treating the second amount of water includes combining the second amount of water with the product water stream into a dischargeable water stream in the injection water reservoir or at the blend point.

According to another aspect, there is provided a membrane-based water treatment system, the system including a water intake system that intakes a first amount of water, a plurality of treatment blocks, a produced water reservoir that intakes a second amount of water; and an injection water reservoir or blend point in fluid communication with the plurality of treatment blocks and the produced water reservoir. Each of the plurality of treatment blocks includes at least one pump, a membrane pressure vessel, a monitor, and a controller. The pump feeds the first amount of intake water through the membrane pressure vessel. The membrane pressure vessel comprises at least one membrane element and separates the first amount of intake water into at least an aqueous permeate stream and a concentrate reject stream. The monitor is used to identify different characteristics of each of the aqueous permeate streams, monitor blending of the aqueous permeate streams from two or more treatment blocks, and to monitor the blended aqueous permeate streams from the two or more treatment blocks based on the identified characteristics and predefined water-characteristic tolerances.

Other aspects and advantages of the invention will be apparent from the following description and the appended claims.

DETAILED DESCRIPTION

Figure 1:
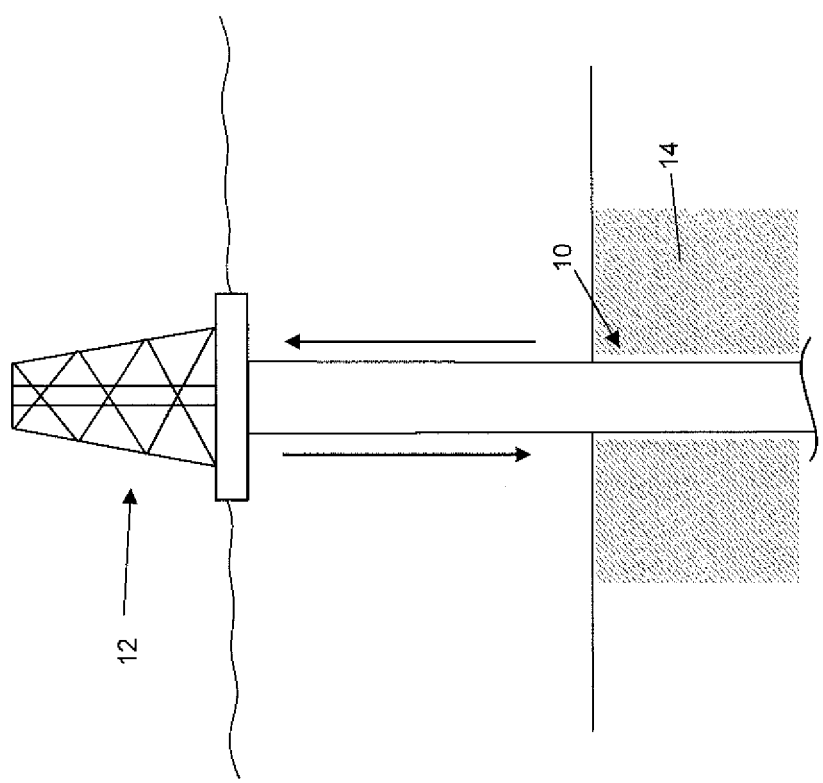
FIG. 1 shows a prior art offshore production well.

One or more embodiments of the present invention will be described below with reference to the figures. In one aspect, embodiments disclosed herein relate to systems and methods for treating seawater or other water source using customizable membrane technology to prepare an aqueous fluid having specific water characteristic tolerances that fall within predefined threshold values. In another aspect, embodiments disclosed herein relate to a water treatment process having a customizable membrane system that may include a bypass blend line which may be used depending on the water outputted from the customizable membrane system to achieve predefined threshold values. In yet another aspect, embodiments disclosed herein relate to the treatment of seawater using a customizable treatment system to produce an aqueous fluid which has specifically tailored properties and which is capable of being used as an injection fluid to be used in improved oil recovery operations. In yet another aspect, embodiments disclosed herein relate to blending treated fluids which have specifically tailored properties. In yet another aspect, embodiments disclosed herein relate specifically to improved oil recovery operations in offshore wells.

Seawater Treatment

Typically, seawater treatment systems are based on several factors. Most importantly, seawater treatment systems depend on the quality of the seawater (e.g., the temperature, salinity, and/or specific chemical composition of the water). In particular, the input water temperature variance of the seawater is the most common factor that varies to which the treatment system must react in order to produce consistent water quality. Water temperature impacts the treatment performance as a function of the water and salt transport property variation of the membranes. Warmer water will result in treated water with higher salinity than the same treatment of cooler water. In addition, as the membrane used in the treatment system ages, its performance changes, thereby impacting the water and salt transport properties and the resulting treated water quality. According to embodiments of the present invention, depending on these factors, a treatment system may be customized to produce any quality of output water desired.

As used herein, the term "predefined water-characteristic tolerances" is used to refer to the desired output water quality that falls within predefined threshold values for any system which will be using the treated water. For example, in downhole applications, it may be desired to produce a water having a salinity of between about 1,000 mg/L and about 30,000 mg/L, a sulfate ion content of between about 5 mg/L and 2,000 mg/L and hardness content of between 5 mg/L and 300 mg/L.

According to one or more embodiments of the present invention, a seawater treatment system may be used to produce water having predefined water-characteristic tolerances, for example, by controlling pumps within the system to ensure that any water having characteristics outside the predefined threshold values is appropriately blended either with treated or untreated (or both) filtered water to produce a water that has characteristics falling inside the predefined threshold values.

In one embodiment, a treatment system comprising multiple membrane blocks may be modified so as to change the operation of each of the membrane blocks themselves so they produce different quality water streams based on the predefined water-characteristic tolerances. These different quality water streams may then be blended together to form a product water stream having predefined water-characteristic tolerances. Alternatively, the product water stream may be further blended with untreated filtered seawater from a blend/bypass line.

In particular, control devices may be used (e.g., a monitor and/or transmitter) to modify or vary the operational parameters of each block based on the outputted permeate water streams. Operational parameters to be modified may include input feed pressure, flux, temperature, flowrate, and water recovery.

Figure 2:
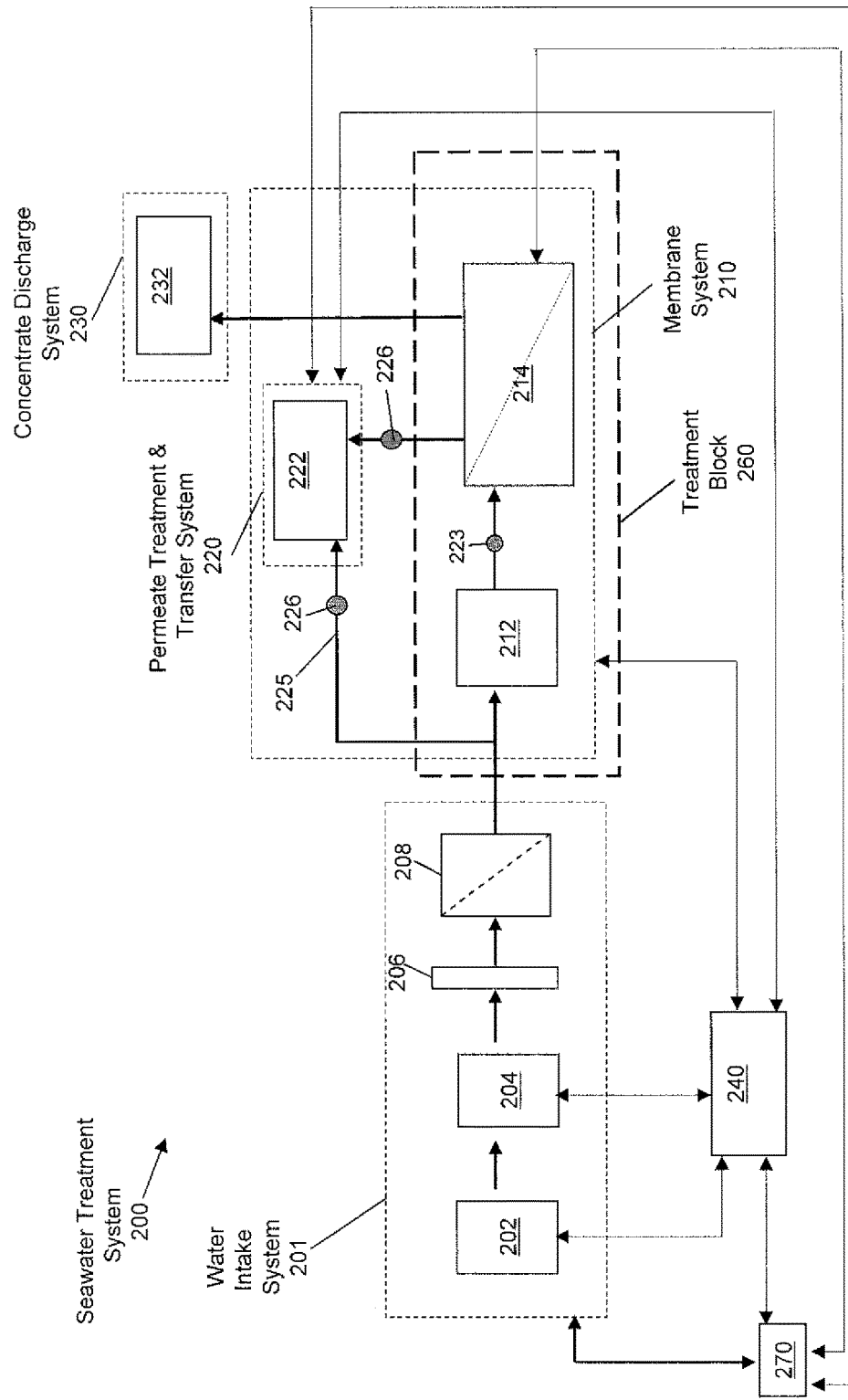
FIG. 2 shows a seawater treatment process according to one or more embodiments of the present invention.

Referring to FIGS. 2 and 3A-C, a seawater treatment system according to one or more embodiments is shown. As shown in FIG. 2, the present invention provides a seawater treatment system 200 that may include a water intake system 201, a membrane system 210, permeate transfer and treatment system 220, a concentrate discharge system 230, a control system 240, and a power source 290. Water intake system 201 may include water intake(s) 202, water intake pump(s) 204, pre-filter(s) 206, and membrane/media-filter(s) 208; membrane system 210 may include variable speed high-pressure pump(s) 212, blend/bypass line(s) 225, either a reverse osmosis and/or nanofiltration membrane(s) 214, and monitor/transmitter(s) 226; the concentrate discharge system 230 may include a plurality of discharge ports; and permeate transfer and treatment system 220 may include permeate transfer pump(s) 222. While in the exemplary embodiments shown, certain components may be shown by a single block/symbol, those skilled in the art will appreciate that each system described may be comprised of a plurality of such elements.

Figure 3A:
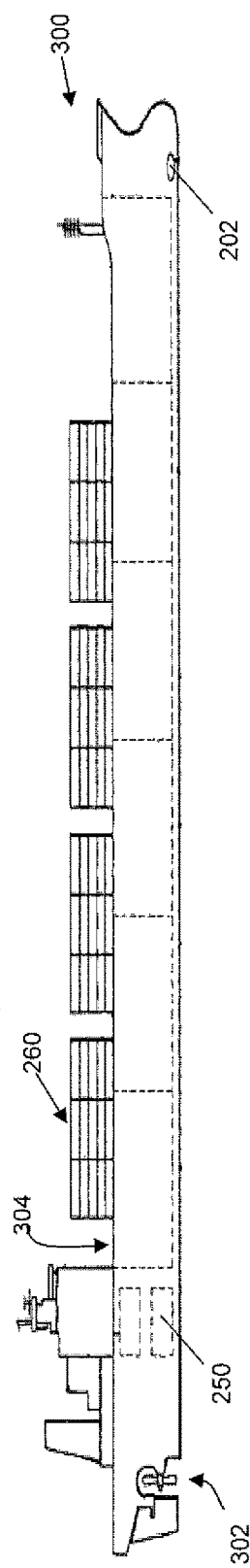
FIG. 3A is a diagram of a seawater treatment unit on a vessel according to one or more embodiments of the present invention.
Figure 3B:
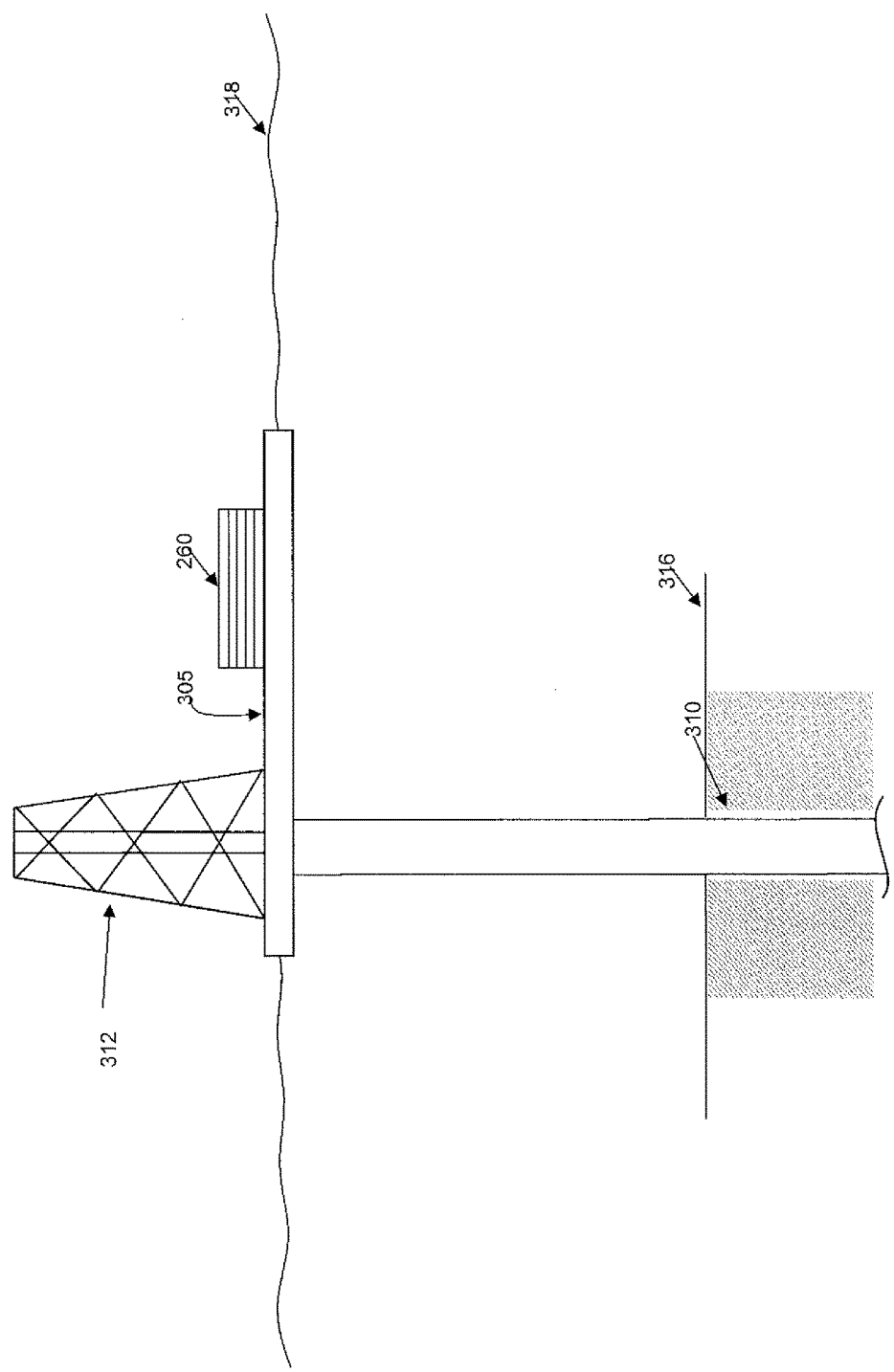
FIG. 3B is a diagram of a seawater treatment unit on an off-shore rig according to one or more embodiments of the present invention.
Figure 3C:
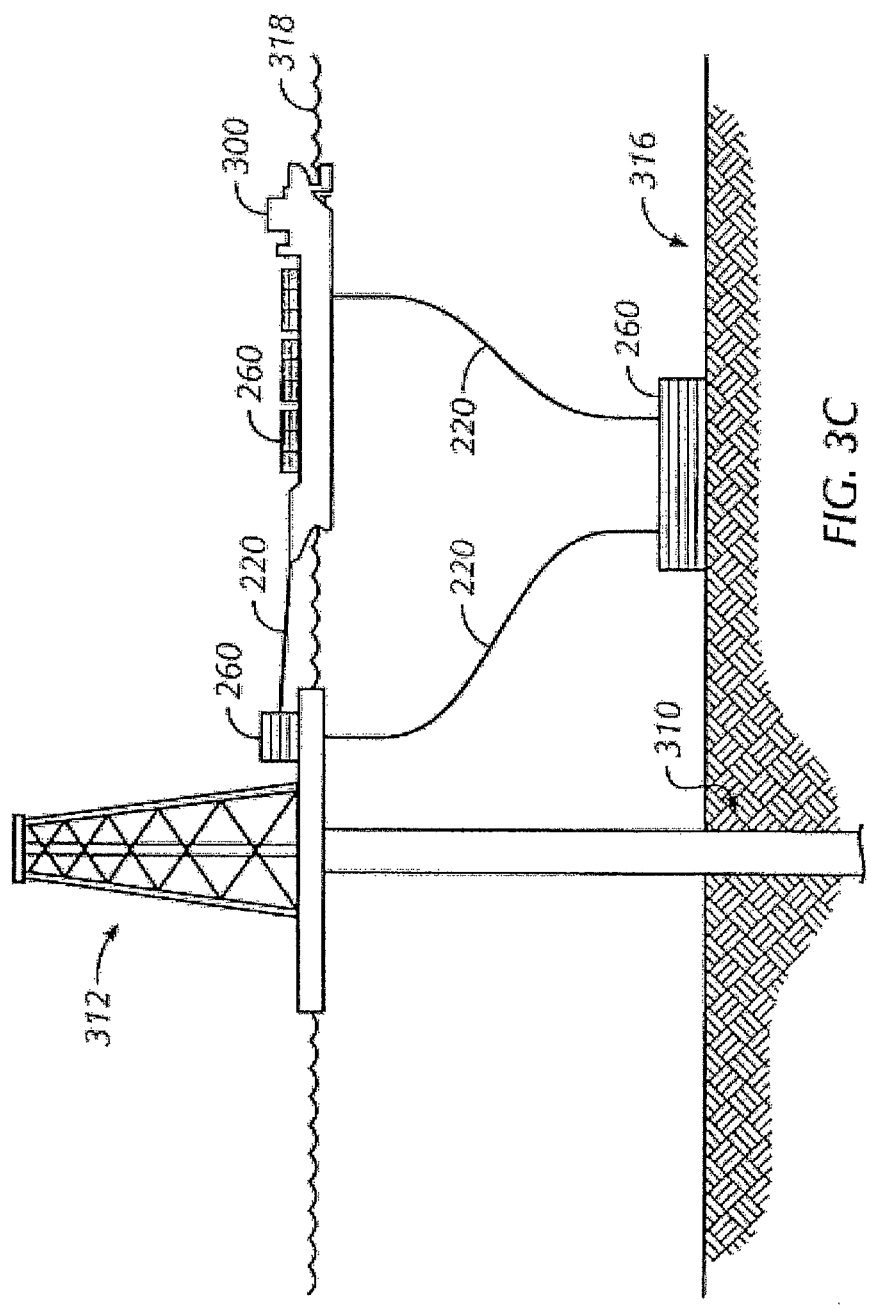
FIG. 3C is a diagram of a rig, a vessel, and a seawater treatment unit on the seafloor according to one or more embodiments of the present invention.

As shown in FIGS. 3A-C, the seawater treatment system 200 may be provided on a vessel 300, on a rig 312, and/or on the seafloor 316. Alternatively, in one or more embodiments, the seawater treatment system 200 may be used onshore.

Additionally, according to one or more embodiments, treatment block 260 may be used to describe the system that includes, for example, membrane system 210, blend/bypass line 225, concentrate discharge system 230.

The treatment block 260 is in communication with the water intake system 201 and the permeate transfer and treatment system 220. Both the control system 240 and the power source 290 are in communication with one another, as well as in communication with the water intake system 201, the permeate transfer and treatment system 220, and treatment block 260 (i.e., membrane system 210 and concentrate discharge system 230). As used herein, the terms "communicate" or "communication" mean to mechanically, electrically, or otherwise contact, couple, or connect by direct, indirect, or operational means.

Within the water intake system 201, water intake pump 204 pumps the intake water through pre-filter 206 to remove any large contaminants (e.g., sand, rocks, plants, debris, etc.) and then through a low pressure membrane or media filter 208 to remove large molecules (e.g., suspended solids, colloids, macromolecules, bacteria, oils, particulate matter, proteins, high molecular weight solutes, etc.). One of ordinary skill in the art will appreciate that depending on the specifications of the equipment and the type and density of particulate matter to be removed, various types of filters, including for example, sand or media filters, cartridge filters, ultra filters, and/or micro filters may be used.

Furthermore, the water intake system 201 may include one or more variable-depth extension members capable of extending into the body of water so as to intake water from a desired depth. Additionally, the extension member may include one or more intake screens designed to help prevent fouling of the intakes by marine life or other particles. One of ordinary skill in the art will appreciate that depending on the intended body of water from which water is being taken, other equipment may also be employed.

After passing through water intake system 201, the filtered seawater may be provided to blend/bypass line 225 and transferred directly to permeate treatment and transfer system 220 where it may then be combined with a permeate stream produced from membrane 214. Additionally, the filtered seawater may be provided to treatment block 260 wherein a variable speed high-pressure pump 212 pushes the filtered seawater through to membrane 214, whereby a concentrate is created on the high pressure side of the membrane 214 and a permeate stream is created on the low pressure side of the membrane 214.

The permeate stream produced from membrane 214 may comprise predefined water-characteristic tolerances, i.e., water that has specific ions and/or molecules removed therefrom, for example, the permeate stream may have lower sulfate ion content and/or lower salinity compared to the filtered seawater produced from water intake system 201. The permeate stream may then be transferred, for example, from vessel 300 to rig 312, from seafloor 316 to rig 312, and/or from rig 312 to well 310, through permeate transfer and treatment system 220.

Alternatively, the permeate stream produced from membrane 214 may not comprise the desired predefined water-characteristic tolerances and may need to be further treated in order to reach the predefined water-characteristic tolerances. For example, the permeate stream may be blended with other permeate streams and/or untreated filtered seawater from the blend/bypass line. However, based on the quality of the permeate stream produced from membrane 214, it may be necessary to change the operation of the membrane block itself so it will produce a different quality water stream based on the outputted permeate stream produced from the membrane and based on predefined water-characteristic tolerances. Such a change may be made by using a monitor 226 to first determine the quality of the outputted permeate stream and second to vary or change the operation of the membrane block itself (e.g., by controlling the pump 212 that pumps water into the membrane block 214 and/or a concentrate line valve 223), thereby changing the quality of the outputted permeate stream for subsequent batches of water.

Additionally, permeate streams from various treatment blocks 260 may be blended together, and may be blended with untreated filtered seawater from the blend/bypass line 225 to produce water having predefined water-characteristic tolerances. Each treatment block can use the same or a different type of RO or NF membrane requiring its respective pressure from the high-pressure pump 212. Blending the various permeate streams from each treatment block can then provide a very specific composition of mono- and divalent ions as a function of optimum reservoir performance. According to one or more embodiments, this very specific composition may then be mixed with water from the blend/bypass line 225.

According to one or more embodiments of the present invention, a monitor 226 may be used to detect the characteristics of the output permeate streams. Based on these characteristics, one or more monitor 226 may be used to change the operation of the membrane block 214, for example, by controlling the variable speed high-pressure pump 212 in real-time to change the amount of water being pumped through membrane 214, so as to produce different quality water having predefined water-characteristic tolerances. Additionally, based on these characteristics, untreated filtered seawater from the blend/bypass line 225 may be blended in with the output permeate streams in order to achieve a water having even more specific water-characteristics tolerances.

In one or more embodiments, a permeate stream from a treatment block 260 can be further treated using forward osmosis (FO) or other treatment, which impacts the chemical composition of the water to further refine the ionic balance as a function of achieving optimum reservoir performance.

In one or more embodiments, instead of seawater as the source of water through intake system 201, brackish water or produced water could be the feed water, thereby allowing the flexibility to switch between brackish water, produced water, and seawater treatment.

The permeate transfer and treatment system 220 may be capable of transferring the permeate produced to a permeate delivery system comprising a pipeline in communication with the permeate transfer and treatment system 220. The pipeline may transfer the permeate, for example, from vessel 300 to rig 312, from seafloor 316 to rig 312, and/or from rig 312 to well 310. The permeate transfer and treatment system 220 may also be capable of treating the permeate produced either prior to, during, or after the permeate is transferred. Treatment of the permeate may include "post-treatment," for example, chemical addition (e.g., in line chemical injection) and/or deaeration (e.g., in a vacuum system).

The concentrate created on the high pressure side of the membrane 214 comprises the ions and/or molecules removed by membrane 214. The concentrate is then disposed of, for example, through a plurality of concentrate discharge ports within the concentrate discharge system 230. However, before the concentrate is disposed of, an energy recovery device (not shown) may be used to capture the energy possessed by the concentrate and return such energy to the variable speed high-pressure pump 212.

Furthermore, the concentrate may be diluted or otherwise treated prior to disposal. For example, in one or more embodiments, the concentrate discharge system 230 may be configured to increase the mixing of the concentrate discharged into the surrounding body of water. The plurality of discharge ports of the concentrate discharge system 230 may be physically located above or below the water line 318 of the vessel 300 and/or the rig 312. Also, the discharge ports may be disposed on a variable-depth extension member that can be positioned so as to promote dispersion of the concentrate into the body of water.

in one or more embodiments, the effluent from membrane 214 (either the permeate stream or the concentrate) may take one or more subsequent passes through membrane 214 and concentrate streams may be recycled to earlier positions in the treatment scheme.

According to one or more embodiments of the present invention, separate power source(s) may provide power to each of the water intake system 201, permeate transfer and treatment system 220, treatment block 260 (i.e., membrane system 210 concentrate discharge system 230), monitor 226, and propulsion device 302. For example, each of the water intake pump 204, variable speed high-pressure pump 212, monitor 226, and permeate transfer pump 222 may be in communication with a separate power source.

According to one or more embodiments, the seawater treatment system 200 may be land-based or provided on a vessel. Where the seawater treatment system 200 is provided on a vessel 300, vessel 300 may further comprise a propulsion device 302 in communication with the power source 290. The vessel 300 may be a self-propelled ship, a moored, towed, pushed or integrated barge, or a flotilla or fleet of such vessels. The vessel 300 may be manned or unmanned. The vessel 300 may be either a single-hull or double-hull vessel.

Alternatively, in one or more embodiments, a single power source may provide power to a combination of two or more of the water intake system 201, membrane system 210, permeate transfer and treatment system 220, concentrate discharge system 230, monitor 226, and/or propulsion device 302 where the seawater treatment system 200 is provided on a vessel 300. For example, electric power for the variable speed high-pressure pump 212 may be provided by a generator driven by the power source for the vessel's propulsion device, such as a vessel's main engine. In such an embodiment, a step-up gear power take off or transmission would be installed between the main engine and the generator in order to obtain the required synchronous speed.

Further, an additional coupling between the propulsion device and the main engine allows the main engine to drive the generator while the vessel is not under way. Moreover, an independent power source (not shown), such as a diesel, steam, or gas turbine, renewable energy generator, or combinations thereof, may power the treatment block 260, the propulsion device 302, or both.

In other embodiments, the power source for seawater treatment system 200 may be dedicated solely to the seawater treatment system 200.

In one or more embodiments, the plurality of concentrate discharge ports of the concentrate discharge system 230 may act as an auxiliary propulsion device for the vessel 300 or act as the sole propulsion device for the vessel 300. Some or all of the concentrate may be passed to propulsion thrusters to provide idling or emergency propulsion.

In one or more embodiments, the power source 290 may comprise electricity producing windmills and/or water propellers that harness the flow of the air and/or water to generate power for the seawater treatment system 200 and/or the operation of the vessel 300 and/or rig 312.

For embodiments where the seawater treatment system 200 is on a vessel 300, the water intake system 201 may be capable of taking in seawater from the water surrounding the vessel 300 and providing it to the treatment block 260. In such embodiments, the water intake 202 of the water intake system 201 may include one or more apertures in the hull of the vessel 300 below the water line 318. An example of a water intake 202 is a sea chest (not shown). Water is taken into the vessel 300 through the one or more apertures (i.e., water intake 202), passed through the water intake pump 204, pre-filter 206, membrane/media filter 208, and either supplied to the variable speed high-pressure pump 212 or supplied to the blend/bypass line 225, or both.

For embodiments where the seawater treatment system 200 is on an offshore rig 312, the water intake system 201 may be capable of taking in seawater from the water surrounding the rig 312 and providing the seawater to the treatment block 260. In such embodiments, the water intake 202 of the water intake system 201 may include an intake riser(s), screen(s), and external or submerged pump(s).

For embodiments where the seawater treatment system 200 is on the seafloor 316, the water intake system 201 may be capable of taking in seawater from the water surrounding the seawater treatment system 200 and providing it to the membrane system 210. In such embodiments, the water intake 202 of the water intake system 201 may include an intake well or riser, screen(s) and pump(s).

The membrane system 210 may comprise a variable speed high-pressure pump 212, a membrane 214, a blend/bypass line 225, and a monitor 226.

In one or more embodiments, membrane 214 is an ion selective membrane, which may selectively prevent or at least reduce hardening or scale-forming ions (e.g., divalent ions including sulfate, calcium, and magnesium ions) from passing across it, while allowing water and other specific ions (e.g., monovalent ions including sodium, chloride, bicarbonate, and potassium ions) to pass across it. The selectivity of the membrane may be a function of the particular properties of the membrane, including pore size and charge characteristics of the polymeric structure comprising the membrane. For example, a polyamide membrane, a cellulose acetate membrane, a nano-embedded membrane, a piperazine-derivative membrane and/or other membrane innovation may be used to selectively prevent or at least reduce sulfate, calcium, and magnesium ions from passing across it. In one or more embodiments, membrane 214 may reduce up to about 99% of the sulfate ions.

In one or more embodiments, membrane 214 is a desalting membrane, which may lower the total salinity or ionic strength of the filtered seawater by preventing or at least reducing ions (e.g., sodium, chloride, calcium, potassium, sulfate, bicarbonate, and magnesium ions) from passing across it.

In one or more embodiments, membrane 214 is a nanofiltration membrane. Examples of commercially available nanofiltration membranes suitable for use in the treatment process of the present disclosure may include, for example, FILMTEC™ SR90 Series, NF 200 Series, NF90 Series which is available from The Dow Chemical Company (Minneapolis, Minn.), or membranes with similar rejection properties from other membrane manufacturers.

In one or more embodiments, membrane 214 is a reverse osmosis membrane. Examples of commercially available reverse osmosis membranes suitable for use in the treatment process of the present disclosure may include, for example, FILMTEC™ SW 30 Series, which is available from The Dow Chemical Company (Minneapolis, Minn.), or other membranes with similar rejection properties from other membrane manufacturers.

Figure 4A:
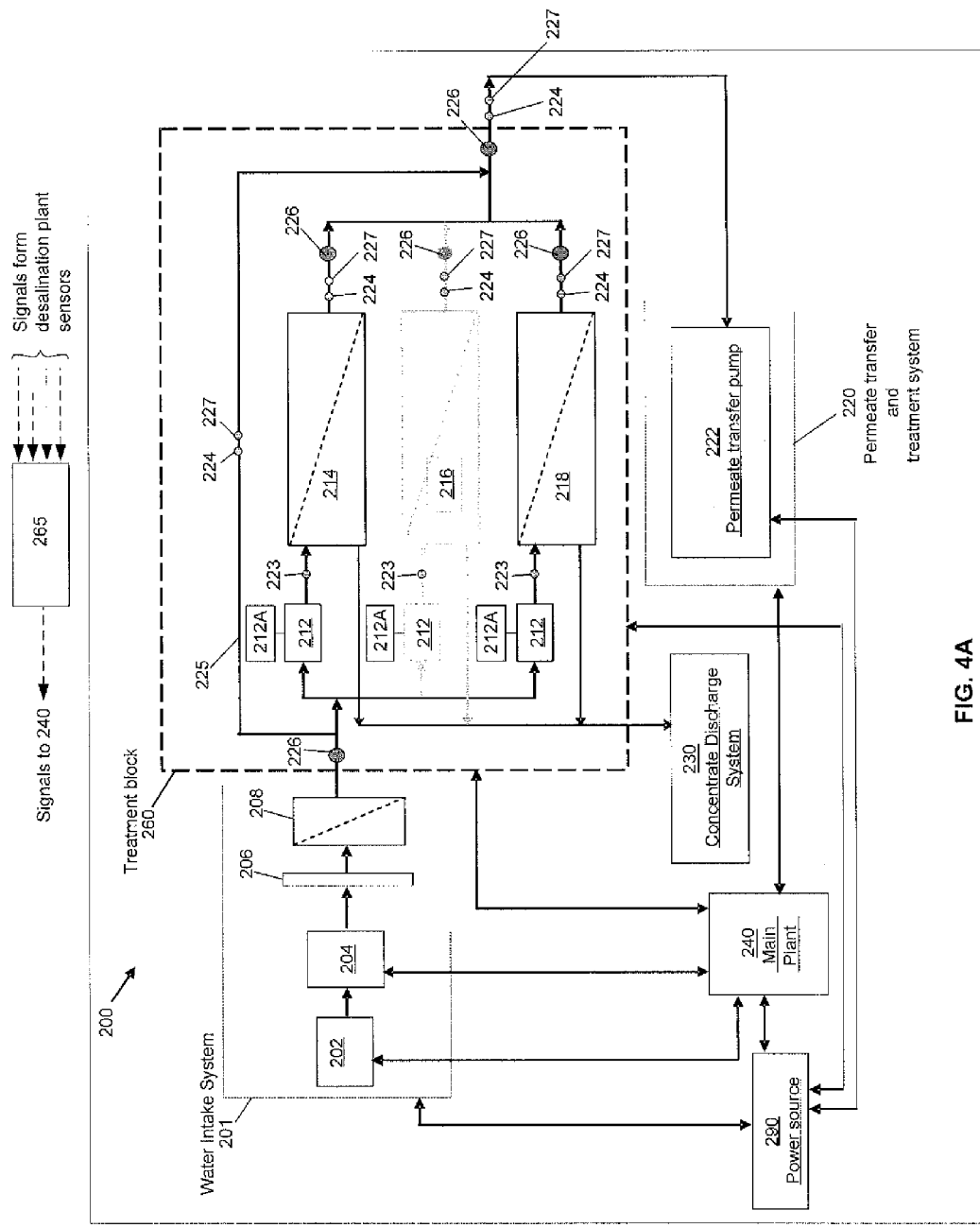
FIG. 4A shows another seawater treatment process according to one or more embodiments of the present invention.
Figure 4B:
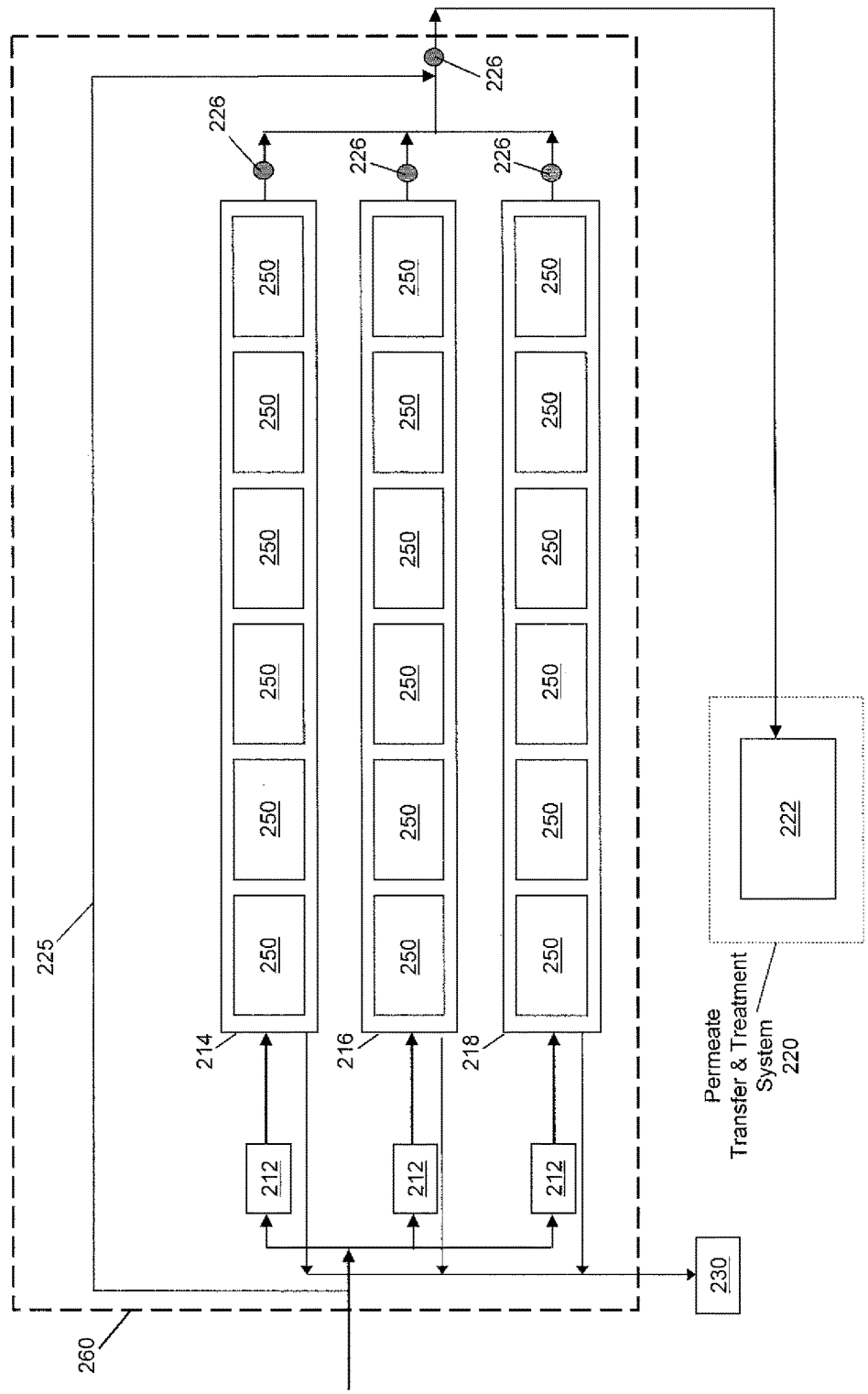
FIG. 4B shows a treatment block according to one or more embodiments of the present invention.

As shown in FIGS. 4A-B, the seawater treatment system 200 may include a membrane system 210 that includes a plurality of membrane pressure vessels (shown as 214, 216, and 218), which may be arranged in parallel. Although three membrane pressure vessels are shown, other embodiments may include more or less than three membranes. According to one or more embodiments, each membrane pressure vessel 214, 216, 218, may include a plurality of membrane elements 250 installed therein. Although six elements 250 are shown in each membrane pressure vessel, other embodiments may include more or less than six elements 250.

Further, in one or more embodiments, at least one of each of a conductivity sensor 224, a flow sensor 226, and a hardness sensor 227 may be disposed on the blend/bypass line 225. In one or more embodiments, each of the conductivity sensor 224, the flow sensor 226, and the hardness sensor 227 may be disposed on the blend/bypass line 225 to measure conductivity, flow, and hardness of water, respectively, passing through the blend/bypass line 225 on each permeate of the membrane pressure vessel. For example, as shown in FIG. 4A, each of the conductivity sensor 224, the flow sensor 226, and the hardness sensor 227 may be disposed on the blend/bypass line 225 to measure conductivity, flow, and hardness of water, respectively, in the blend/bypass line 225 after the water passes through each membrane pressure vessel 214, 216, 218. Those having ordinary skill in the art will appreciate that each of the conductivity sensor 224, a flow sensor 226, and a hardness sensor 227 may be any conductivity sensor, flow sensor, or hardness sensor known in the art.

Furthermore, in one or more embodiments, the seawater treatment system 200 may include a desalination water controller 265. In one or more embodiments, the desalination water controller 265 may take signals from desalination plant sensors and output signals to the main plant 240.

Figure 4C:
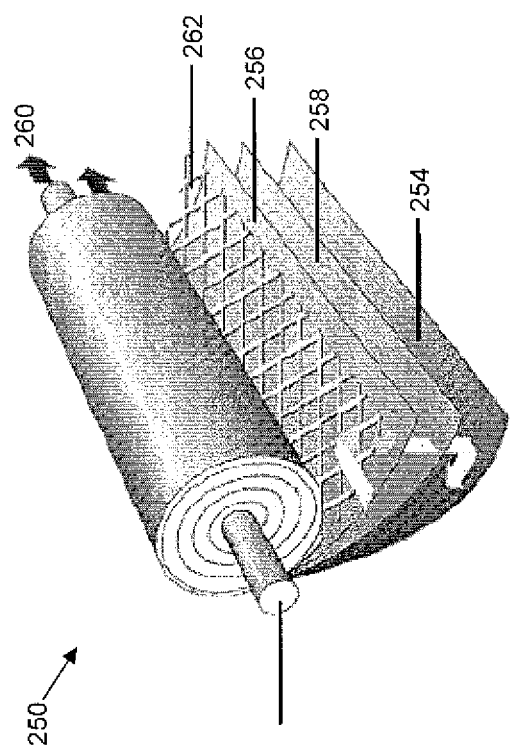
FIG. 4C shows a spiral wound membrane element according to one or more embodiments of the present invention.

As shown in FIGS. 4B-C, according to one or more embodiments, each element 250 may comprise, for example, reverse osmosis membrane elements, nanofiltration membrane elements, or other membrane elements known in the art. Membrane elements 250 may comprise one of several configurations known in the art, for example, spiral wound (SW) and/or hollow fine fiber (HFF).

As shown in FIG. 4C, according to one or more embodiments, elements 250 may comprise spiral wound elements 250. Spiral wound elements 250 may be constructed from flat sheet membranes 254 and 256 and may include a backing material 258 to provide mechanical strength. The membrane material may be cellulosic (i.e., cellulose acetate membrane) or non-cellulosic (i.e., composite membrane). For cellulose acetate membranes, the two layers may be different forms of the same polymer, referred to as "asymmetric." For composite membranes, the two layers may be completely different polymers, with the porous substrate often being polysulfone.

In the spiral wound design, the membrane is formed in an envelope that is sealed on three sides. A supporting grid, called the product water carrier, is on the inside. The envelope is wrapped around a central collecting tube 261, with the open side sealed to the tube. Several envelopes, or leaves, are attached with an open work spacer material 262 between the leaves. This is the feed/concentrate, or feed-side spacer. The leaves are wound around the product water tube 261, forming spirals if viewed in cross section. Each end of the unit may be finished with a plastic molding, called an "anti-telescoping device," and the entire assembly may be encased in a thin fiberglass shell (not shown). Feed water may flow through the spiral over the membrane surfaces, roughly parallel to the product water tube 261. Product water flows in a spiral path within the envelope to the central product water tube 261. A chevron ring (not shown) around the outside of the fiberglass shell may force the feed water to flow through the element 250.

Figure 4D:
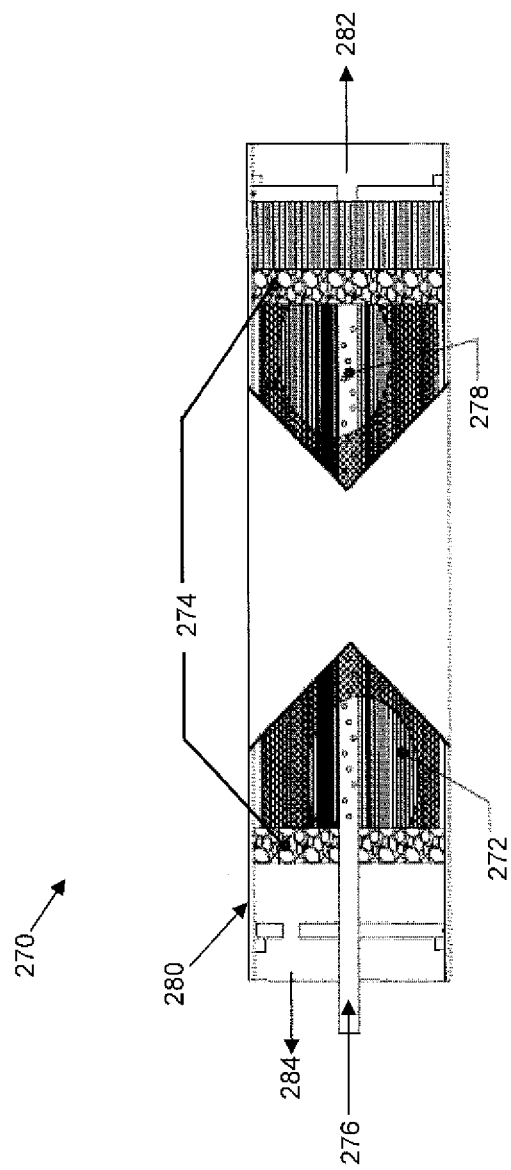
FIG. 4D shows a schematic for a hollow fine fiber membrane element according to one or more embodiments of the present invention.

As shown in FIG. 4D, according to one or more embodiments, elements 250 may comprise hollow fine fiber elements 270. The design of the hollow fine fiber elements 270 may include a plurality of hollow fiber membranes 272 being placed in a membrane pressure vessel 280. The hollow fine fiber may be a polyaramid or a blend of cellulose acetates. The membranes 272 may have an outside diameter of about 100 to about 300 microns and in inside diameter between 50 and about 150 microns. The fibers may be looped in a U-shape, so both ends are imbedded in a plastic tubesheet 274. The pressurized seawater may be introduced into the vessel (indicated by arrow 276) along the outside of the hollow fibers. Under pressure, desalted water passes through the walls of the hollow fiber membranes 272 and flows down the inside of the fiber membranes 272 to a permeate collection tube 278 for collection (as indicated by arrow 282), while the separated concentrate is removed from the membrane pressure vessel 280 (as indicated by arrow 284).

According to one or more embodiments, all of the membrane pressure vessels in membrane system 210 may comprise elements 250 having only reverse osmosis membrane elements installed therein. In another embodiment, all of the membrane pressure vessels in membrane system 210 may comprise elements 250 having only nanofiltration membrane elements installed therein. In other embodiments, one or more membrane pressure vessel (e.g., membrane pressure vessel 214) may comprise elements 250 having either nanofiltration or reverse osmosis membrane elements installed therein while the remaining membrane pressure vessels (e.g., membrane pressure vessels 216 and 218) comprise elements 250 having only reverse osmosis or nanofiltration membrane elements installed therein. While specific examples of combinations of membrane pressure vessels and membrane element types are listed here, these examples are not intended to be exhaustive and other combinations may be used. Those skilled in the art will appreciate other appropriate examples and combinations, which are intended to be encompassed by one or more embodiments.

As shown in FIGS. 3A-C, one or more treatment blocks 260 may be installed on the deck 304 of a vessel 300, on the platform 305 of a rig 312, and/or on the seafloor 316, depending on the location of the seawater treatment system 200. Additionally, the one or more treatment blocks may also be installed in other parts of the vessel 300 and/or the rig 312, or even on multiple levels of the vessel 300 and/or the rig 312. For example, each treatment block may be installed in a separate container. Several containers can be placed on top of each other to optimize the use of the deck 304 and/or platform 305 to decrease the time and expense associated with construction of the seawater treatment system on the vessel 300 and/or rig 312. The one or more treatment blocks may be installed in series or in parallel.

Within the water intake system 201, water intake pump 204 pumps the intake water through pre-filter 206 to remove any large contaminants (e.g., sand, rocks, plants, debris, etc.) and then through filter 208 to remove large molecules (e.g., suspended solids, colloids, macromolecules, bacteria, oils, particulate matter, proteins, high molecular weight solutes, etc.). After passing through water intake system 201, the filtered seawater is provided to treatment block 260 by variable speed high-pressure pump 212. Although only one treatment block 260 is shown, according to one or more embodiments, there may be more than one treatment block arranged in series and/or in parallel.

According to one or more embodiments, within treatment block 260, there may be one or more membrane pressure vessels (e.g., 214, 216, and 218). In one embodiment, the pressurized seawater may be pushed through the first membrane pressure vessel (e.g., 214) having one or more elements 250 with membrane elements installed therein, thereby creating a first permeate stream and a first concentrate stream. The first permeate stream may comprise water that has specific ions removed therefrom, for example, the first permeate stream may have lower sulfate ion content and/or lower salinity compared to the filtered seawater produced from water intake system 201. The first concentrate stream may comprise the ions and/or molecules removed by the membrane elements in the first membrane pressure vessel (e.g., 214). The first concentrate stream may then be disposed of, for example, through a plurality of concentrate discharge ports within the concentrate discharge system 230. However, before the first concentrate is disposed of, an energy recovery device (not shown) may be used to capture the energy possessed by the first concentrate stream and return such energy to the variable speed high-pressure pump 212.

According to one or more embodiments, one or more monitors 226 may be used to determine the characteristics of the output permeate streams created by the one or more membrane pressure vessels 214, 216, 218. According to one or more embodiments, one or more monitors 226 may be used to determine the characteristics of the streams created by blending the output permeate streams with the blend/bypass lines. Based on these characteristics, monitors 226 may be used to change the performance of the membranes in pressure vessels 214, 216, 218 to produce different quality water by controlling the variable speed high-pressure pumps 212 to change, real-time, the amount of water being pumped through membrane pressure vessels 214, 216, 218. Similarly, based on these characteristics, monitors 226 may be used to control the amount of untreated filtered seawater water provided to the blend/bypass line 225, i.e., monitors 226 may be used to trigger an amount of untreated filtered seawater water being blended in with the output permeate streams in order to achieve a water having even more specific characteristics.

According to one or more embodiments, this process may continue for as many membrane pressure vessels as there are in the treatment block 260. Additionally, this process may continue for as many treatment blocks 260 as there are in the treatment system 200, until a final permeate stream, optionally having untreated filtered seawater water blended therein, is produced from a final membrane pressure vessel. The final permeate stream may then be transferred, for example, from vessel 300 to rig 312, from seafloor 316 to rig 312, and/or from rig 312 to well 310, through the permeate transfer and treatment system 220.

In one or more embodiments, the membrane elements installed within the membrane pressure vessels (e.g., 214, 216, and 218) are all ion selective membrane elements that lower the salinity or ionic strength of the seawater by selectively preventing or at least reducing certain ions (e.g., sodium, calcium, potassium, and magnesium ions) from passing through the membrane elements, while allowing water and other specific ions (e.g., sulfate, calcium, magnesium, and bicarbonate ions) to be produced for use and/or further treatment. In other embodiments, the membranes elements are all ion selective membranes that selectively prevent or at least reduce hardening or scale-forming ions (e.g., sulfate, calcium, magnesium, and bicarbonate ions) from passing through the membrane elements, while allowing water and other specific ions (e.g., sodium and potassium ions) to be produced for use and/or further treatment.

In one or more embodiments, the seawater treatment system 200 may include multiple treatment blocks 260, wherein the multiple treatment blocks 260 each comprise different membrane pressure vessels. For example, in one embodiment, one or more treatment block 260 may include membrane pressure vessels (e.g., 214, 216, and 218) having membrane elements installed therein wherein the membrane elements comprise only nanofiltration membrane elements, while one or more separate treatment block 260 includes membrane pressure vessels (e.g., 214, 216, and 218) having membrane elements installed therein wherein the membrane elements comprise only reverse osmosis membrane elements. Additionally, one of ordinary skill in the art would recognize that the number of treatment blocks in a system may vary in one or more embodiments. Further, one of ordinary skill in the art in possession of the present disclosure will recognize that the membrane elements may vary and may be, for example, spirally wound, hollow fiber, tubular, plate and frame, or disc-type.

According to one or more embodiments, the variable speed high-pressure pump that operates to push the pretreated water through the treatment block 260 may be controlled by monitor 226 and may comprise any pump suitable to generate the hydraulic pressure necessary to push the water through the one or more membrane pressure vessels. However, the pump discharge pressure must be controlled in order to maintain the designated permeate flow and, more importantly, to not exceed the maximum allowed feed pressure for the membrane elements being used. This is of particular importance because if the maximum allowed feed pressure is exceeded, the membrane element may blow out and thereby fail prematurely. Because the maximum allowed feed pressure for nanofiltration elements is typically much less than the maximum allowed feed pressure for reverse osmosis element, conventional membrane systems having more than one type of membrane (e.g., nanofiltration and reverse osmosis) typically require more than one pump (i.e., a pump for each type of membrane). Conventional systems with nanofiltration membranes installed cannot change to reverse osmosis membranes due to this pressure differential.

However, according to one or more embodiments, the treatment block 260 may include a variable-speed high-pressure pump 212 that is controlled by monitor 226 and that provides the filtered seawater to more than one membrane pressure vessel. Because the membrane pressure vessels may vary in size and/or may include different types of membrane elements, and therefore require varying feed pressures, the high-pressure pump 212 must be able to provide an adjustable feed pressure based on the type of system being used and based on the water characteristics detected by the monitor 226. In one or more embodiments, the variable speed high-pressure pump may comprise, for example, a positive displacement pump.

In one or more embodiments, a pump may be used to provide approximately 16,068 $m^3/d$ (or 670 $m^3/hr$ or 2950 gpm) at varying pressures. Specifically, for a seawater reverse osmosis (SWRO) treatment system with an energy recovery device (ERD), the lowest needed pressure is about 26.5 bar and the highest needed pressure may be about 30.2 bar. For an NF system with no ERD, the lower required pressure is about 27 bar while the highest required pressure may be about 39 bar. For a sulfate reducing nanofiltration (SRNF) system with no ERD, the lowest needed pressure may be about 14 bar and the highest required pressure may be about 19 bar.

One or more embodiments of the present invention may also include variable frequency drives (VFD) on the high-pressure pump. The VFD are systems that control the rotational speed of an alternating current (AC) electric motor by controlling the frequency of the electrical power supplied to the motor. By employing VFD, the pressures created by the variable speed high-pressure pump can also be varied according to the specific needs of the system at any time, for example, as a function of operation, membrane type, water quality objectives, and/or seawater temperature and salinity.

Figure 4E:
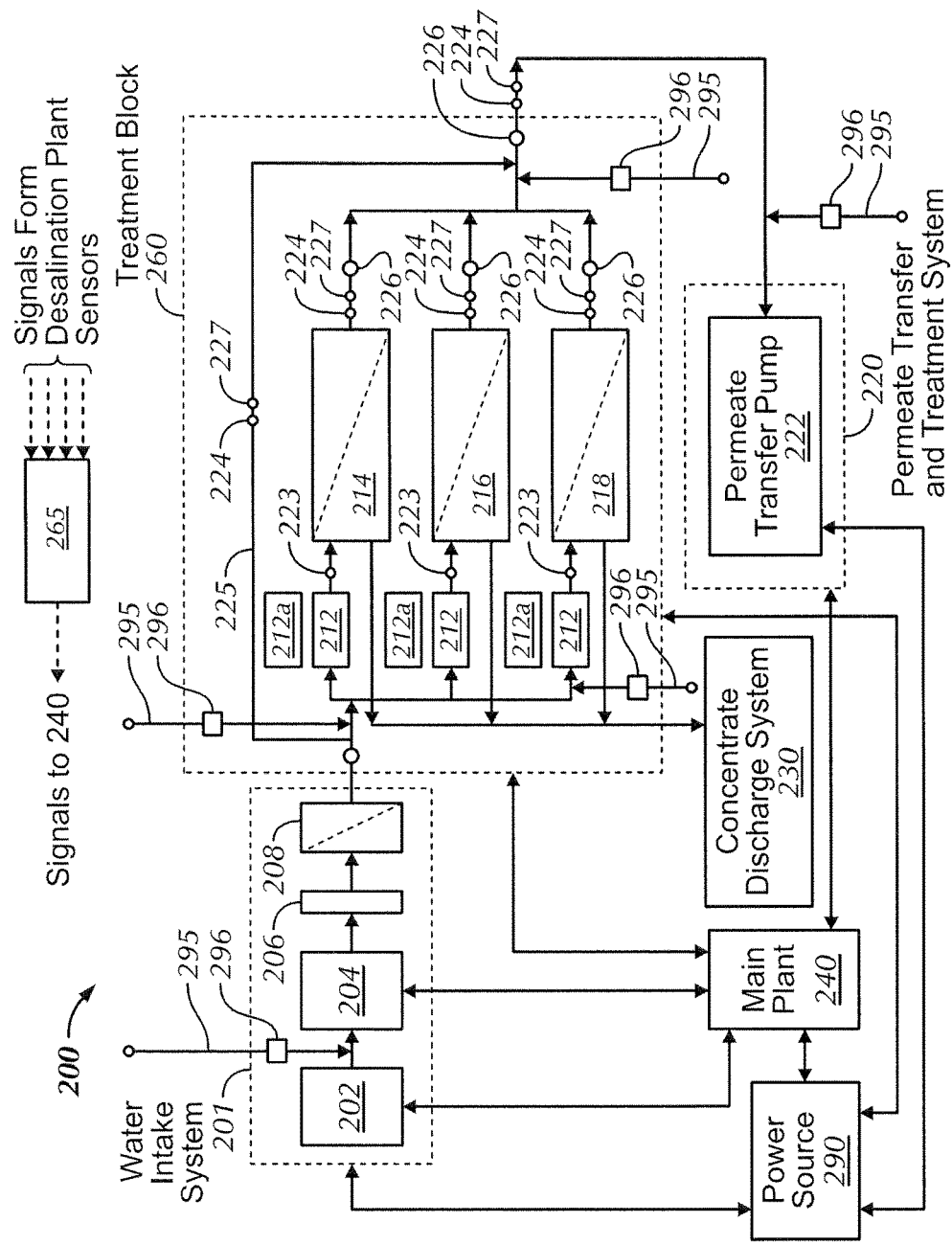
FIG. 4E shows another seawater treatment process according to one or more embodiments of the present invention.

Referring to FIG. 4E, in one or more embodiments, a slip stream line 295 may be included in the system. Like elements of the system shown in FIG. 4E to the elements shown and described in other embodiments are given like reference numerals and detailed description thereof is omitted. In embodiments including a slip stream line 295, the controller 265 may also control valves 296 connecting the slip stream line 295 to other lines in the system for addition of specially-treated water. The valves 296 may be located at various positions in the system, e.g., at the entrances of the system pumps, at water blending points in the system, etc. For instance, the slip stream line 295 may contain water having an additive acid or base to assist with balancing the quality of the water being processed. Additionally, the slip stream line may contain warmer or cooler water than the water in the system to assist with balancing the temperature of the water being processed. Controller 265 may blend water from slip stream 295 so as to improve overall system efficiency, reduce power consumption, etc.

Accordingly, one or more embodiments provide a seawater treatment system having the flexibility to switch between multiple membrane elements using high-pressure pumps that may be varied, real-time, by a controller that monitors the characteristics of the output permeate streams and then transmits a signal to the high-pressure pumps to either pump more or less water through the membrane elements and/or blend in untreated filtered seawater from the blend/bypass line to achieve a water having specifically tailored properties without having to pass through multiple treatment systems. For example, as shown in FIGS. 4A-4B, VFDs 212A may be integrated into the seawater treatment system 200 and may allow the pressures created by the high-pressure pumps 212 to be varied according to the specific needs of the seawater treatment system 200 at any time.

As discussed above, seawater has a high ionic content relative to fresh water. For example, seawater is typically rich in ions such as sodium, chloride, sulfate, magnesium, potassium, and calcium ions. Seawater typically has a total dissolved solids (TDS) content of at least about 30,000 mg/L. According to one or more embodiments, it is preferred that the permeate stream have a total dissolved solids content of between about 1,000 mg/L and about 30,000 mg/L.

Improved Oil Recovery

As noted above, improved oil recovery processes commonly inject water into a subterranean hydrocarbon-bearing reservoir via one or more injection wells to facilitate the recovery of hydrocarbons from the reservoir via one or more hydrocarbon production wells. The water can be injected into the reservoir as a waterflood in a secondary oil recovery process. Alternatively, the water can be injected into the reservoir in combination with other components as a miscible or immiscible displacement fluid in a tertiary oil recovery process. Water is also frequently injected into subterranean oil and/or gas reservoirs to maintain reservoir pressure, which facilitates the recovery of hydrocarbons and/or gas from the reservoir.

According to one or more embodiments, injection fluids may include aqueous solutions (e.g., seawater) that have been treated according to methods disclosed above. In a particular embodiment, the seawater may first undergo filtration in a water intake system whereby the seawater is pumped through a first filter to remove any large contaminants (e.g., sand, rocks, plants, debris, etc.) and then through a second filter to remove large molecules (e.g., suspended solids, colloids, macromolecules, bacteria, oils, particulate matter, proteins, high molecular weight solutes, etc.). One of ordinary skill in the art will appreciate that depending on the specifications of the equipment and the type and density of particulate matter to be removed, various types of filters, including for example, sand or media filters, cartridge filters, ultra filters, and/or micro filters may be used.

After passing through the water intake system, the filtered seawater may be provided to a seawater treatment system such as the one depicted in the figures of the present disclosure. Specifically, as shown in FIGS. 4A-B, the filtered seawater may be provided to a treatment block 260 and either sent through blend/bypass line 225 or pumped by variable speed high-pressure pump 212, which pushes the filtered seawater through to one or more membrane pressure vessels (e.g., 214, 216, and 218), thereby creating a permeate stream and a concentrate stream.

Figure 5:
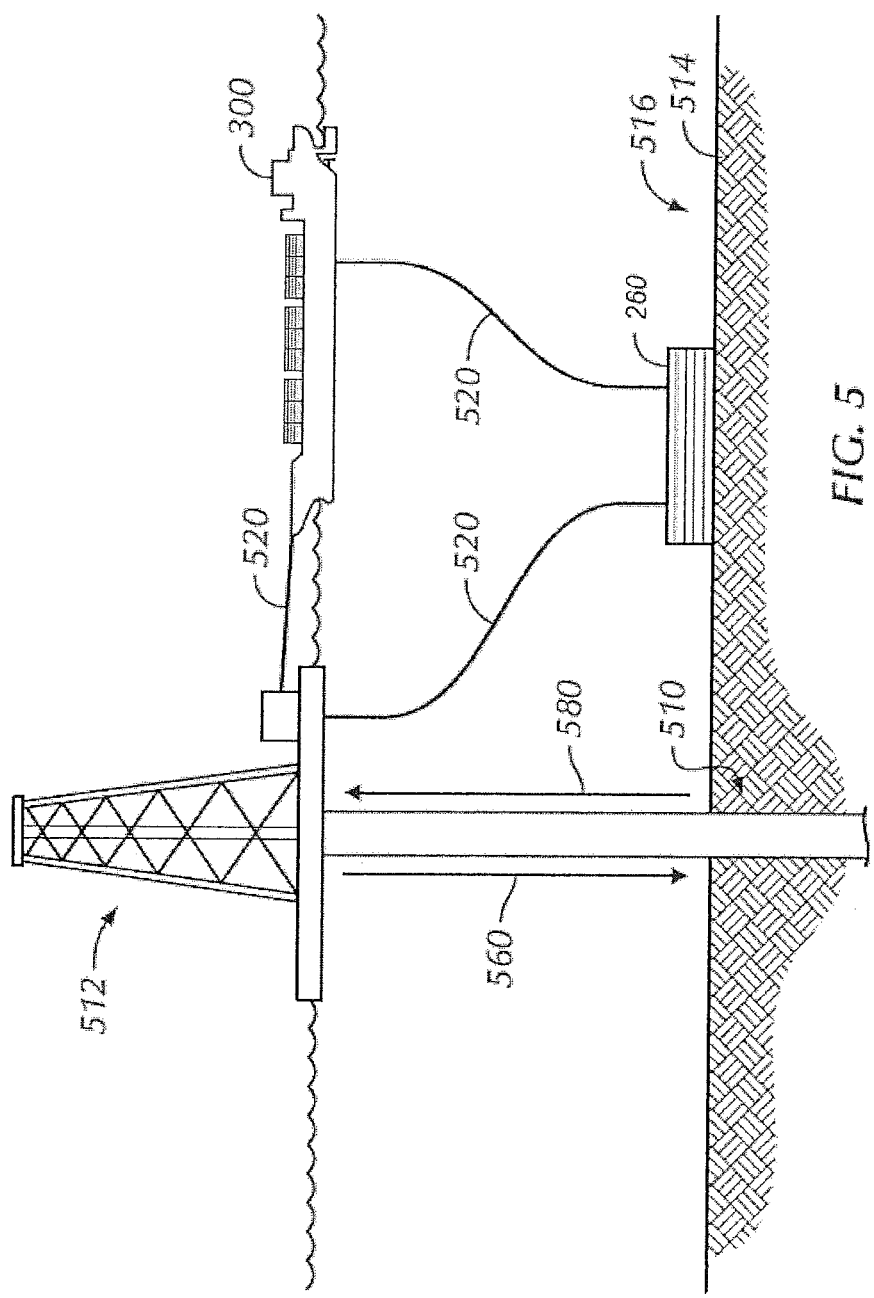
FIG. 5 shows an improved oil recovery system according to one or more embodiments of the present invention.

The permeate stream may comprise water that has specific ions and/or molecules removed therefrom, for example, the permeate stream may have lower sulfate ion content and/or lower salinity compared to the filtered seawater produced from the water intake system. A monitor may be used to detect the characteristics of the permeate stream and, based on these characteristics, control the high-pressure pumps and blend line and effectively produce a water that is customized for a very specific purpose. As shown in FIG. 5, the permeate stream may then be transferred, for example, from vessel 300 to rig 512, from seafloor 516 to rig 512, and/or from rig 512 to well 510, through permeate transfer system 520 and used as an injection fluid for improved recovery of hydrocarbons from a subterranean hydrocarbon-bearing formation 514.

The concentrate stream may comprise the ions and/or molecules removed by the membrane elements within the one or more membrane pressure vessels. The concentrate stream may then be disposed of, for example, through a plurality of concentrate discharge ports within the concentrate discharge system. However, before the concentrate is disposed of, an energy recovery device may be used to capture the energy possessed by the concentrate stream and return such energy to variable speed high-pressure pump. Also, the concentrate may be diluted or otherwise treated prior to disposal.

In one or more embodiments, the effluent from the one or more membrane pressure vessels (either the permeate stream and/or the concentrate stream) may take one or more subsequent passes through treatment block 260. Additionally, in some embodiments, more than one treatment block and/or more than one blend/bypass line may be used in the seawater treatment system.

In one or more embodiments, a method for recovering hydrocarbons from a subterranean hydrocarbon-bearing formation 514 may include injecting the permeate stream into a hydrocarbon-bearing formation 514 via an injection well 560, displacing hydrocarbons with the permeate towards an associated hydrocarbon production well 580, and recovering the hydrocarbons from the formation 514 via the hydrocarbon production well 580.

Preferably, the methods of one or more embodiments may result in an increase in hydrocarbon recovery from a hydrocarbon bearing formation, for example in the range of about 2% to about 40%, when compared with a waterflood treatment using untreated high salinity injection water.

Figure 6A:
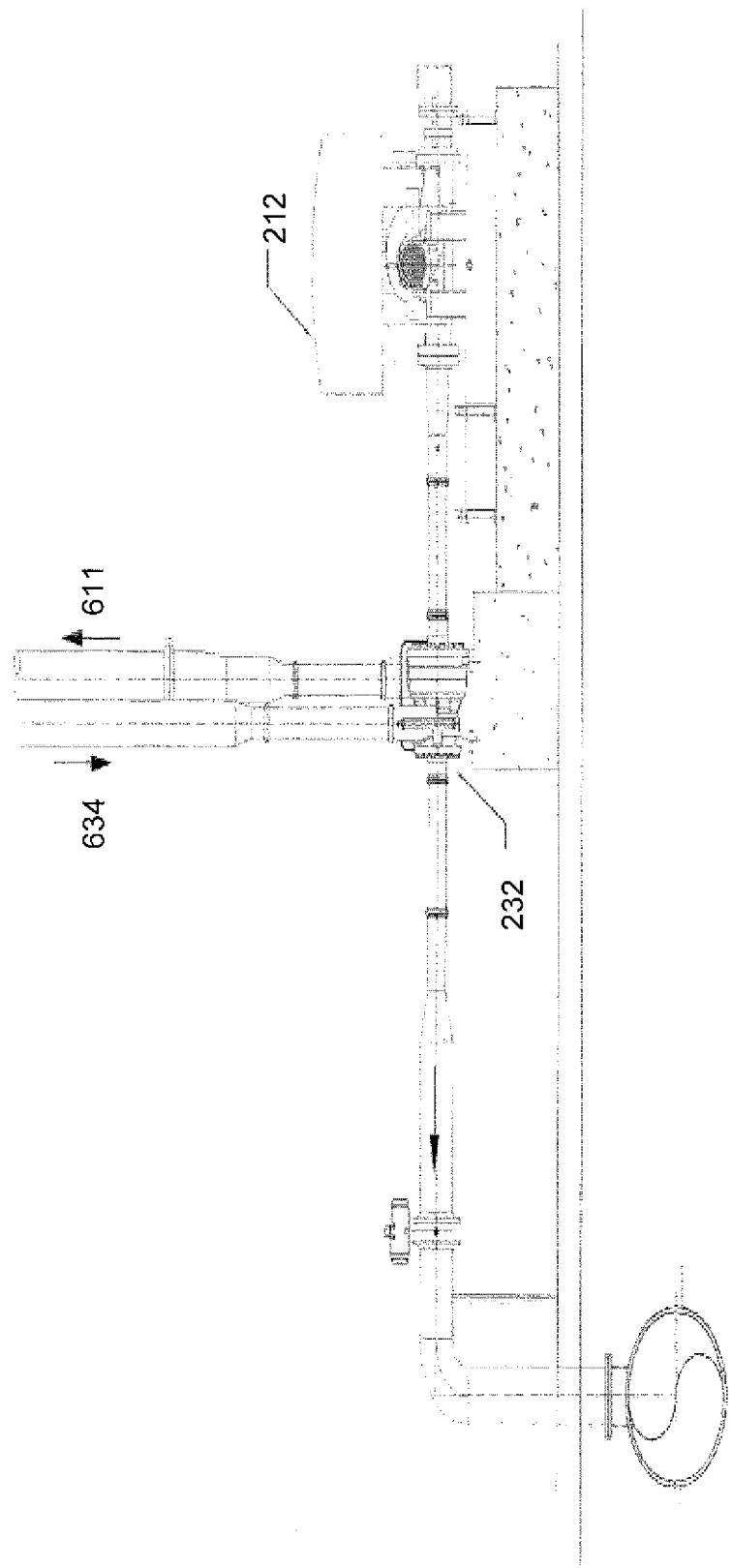
FIG. 6A shows a configuration for a system or method according to one or more embodiments of the present invention.
Figure 6B:
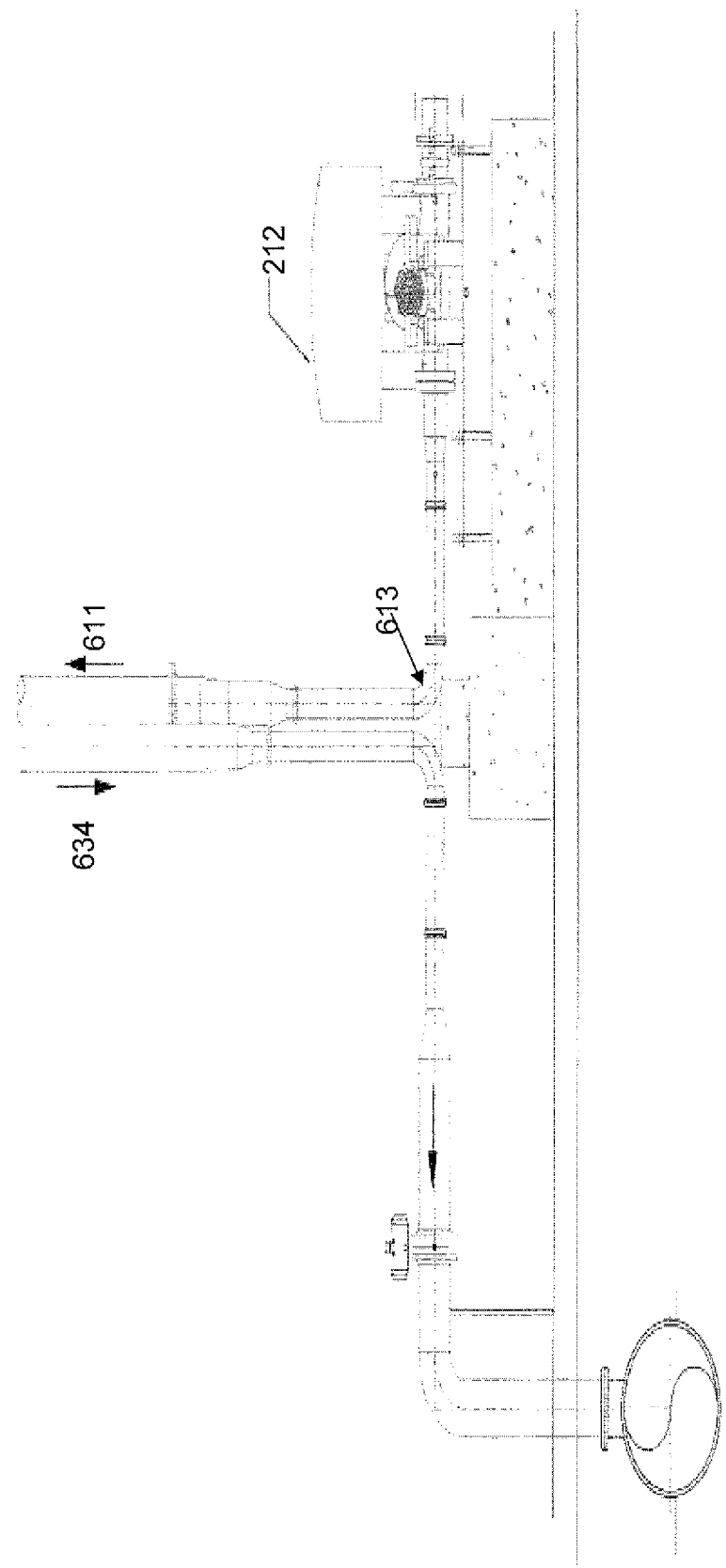
FIG. 6B shows a configuration for a system or method according to one or more embodiments of the present invention.

As shown in FIGS. 6A-B, the systems and methods of one or more embodiments of the present invention may be included in various configurations. Specifically, as shown in FIGS. 6A-B, a system and/or method of the present invention may be configured so that the variable speed high-pressure pump 212 pushes the filtered seawater 611 through one or more treatment blocks, thereby creating a concentrate stream 634 and a permeate stream (not shown), wherein the permeate stream may then be analyzed using a monitor (not shown) to determine the characteristics of the output permeate stream. Based on these characteristics, the monitor may be used to control the variable speed high-pressure pump 212 real-time by varying the amount of water being pumped through membrane 214. Additionally, based on these characteristics, untreated filtered seawater from the blend/bypass line 225 may be blended in with the permeate stream in order to achieve a water having specific characteristics.

The concentrate stream 634 may then be disposed of, for example, through a plurality of concentrate discharge ports within the concentrate discharge system. However, before the concentrate stream 634 is disposed of, an energy recovery device 232 may be used to capture the energy possessed by the concentrate stream 634 and return such energy to variable speed high-pressure pump 212. Also, the concentrate stream 634 may be diluted or otherwise treated prior to disposal. Alternatively, as shown in FIG. 6B, a system and/or method of the present invention may be configured so that the concentrate stream 634 bypasses the concentrate discharge system, for example, via elbow piping 613.

Additionally, in other embodiments of the present invention, the systems and/or methods of the present invention may be capable of switching back and forth between systems shown in FIGS. 6A-B. For example, when blending of untreated filtered seawater with the permeate streams is desired, the monitor may be used to control the variable speed high-pressure pump so as to pump an appropriate amount of water through one or more treatment blocks and produce one or more permeate streams which may then be blended with untreated filtered seawater from the blend/bypass line; however, when blending of untreated filtered seawater is not required, the blend/bypass line may be bypassed.

Figure 7:
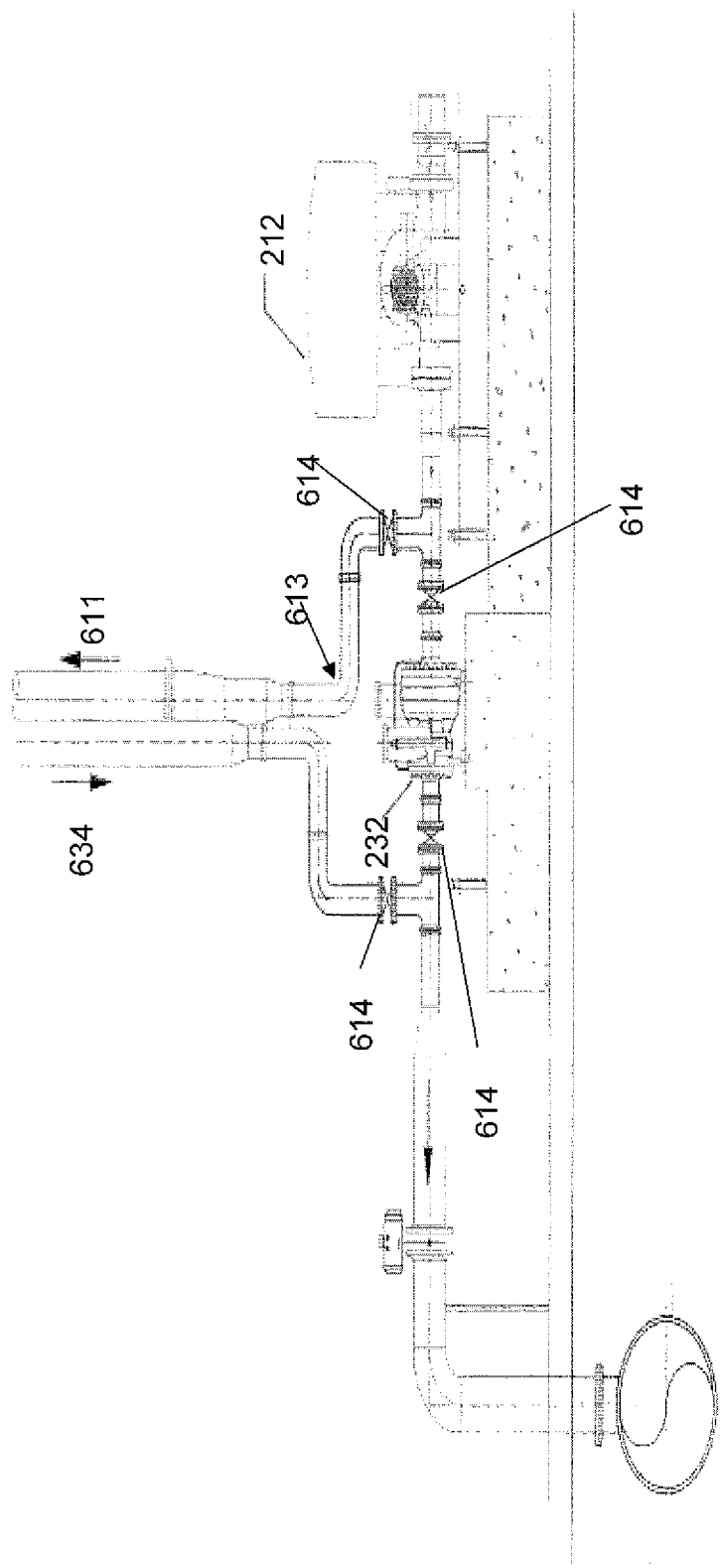
FIG. 7 shows a configuration for a system or method according to one or more embodiments of the present invention.

Furthermore, as shown in FIG. 7, a system and/or method according to one or more embodiments of the present invention may include both an energy recover device 232 and elbow piping 613, wherein the energy recover device 232 and the elbow piping 613 are connected via valves 614. In one embodiment, the valves 614 may be left open so as to allow the concentrate stream 634 to be piped directly in to the energy recover device 232. In another embodiment, some valves 614 may be closed so as to bypass the energy recover device 232. Also, the concentrate stream 634 may be diluted or otherwise treated prior to disposal.

EXAMPLES

The following examples are provided to further illustrate the application and use of the methods and systems disclosed herein for treating seawater.

Example 1

A system comprised of a treatment block of seawater reverse osmosis membranes and a treatment block of seawater nanofiltration membranes is configured such that the flowrates to each treatment block and the respective high-pressure pump to each block can be regulated. The treatment block is comprised such that it produces approximately 60% of the permeate flow using the nanofiltration block operating at 42% recovery and 40% of the permeate flow using the reverse osmosis block operating at 40% recovery. In this example, the specific (target) salinity (total dissolved solids) of the blended permeate is 2,900 mg/L (+/−100 mg/L) and the maximum allowable hardness is 60 mg/L (as defined by the combined calcium and hardness ion concentration, in mg/L). The operating range of the system is 25 to 30° C.

Exhibit 1 provides the natural deviation of the salinity and hardness of a conventional system, comprised of 60% nanofiltration and 40% reverse osmosis, over the temperature range.

| Exhibit 1 | | | | | |
|---|---|---|---|---|---|
| | Conventional System | | Permeate Flow Distribution | | Membrane Flux, Lmh |
| | TDS, mg/L | Hardness | NF | RO | NF | RO |
| 25 | 2918 | 51.1 | 60% | 40% | 14.57 | 14.50 |
| 30 | 3723 | 67.2 | 60% | 40% | 14.57 | 14.50 |

The results indicate that the permeate at 25° C. meets the permeate water quality specifications but the permeate produced at 30° C. does not.

If the feed flows are reapportioned between the two treatment blocks such that 49% of the permeate flow originates from the nanofiltration block and 51% originates from the reverse osmosis block, with corresponding changes in membrane flux and feed pressures, then the blended permeate quality will meet the water quality specifications at 30° C., as shown in Exhibit 2.

| Exhibit 2 | | | | | |
|---|---|---|---|---|---|
| | Conventional System | | Permeate Flow Distribution | | Membrane Flux, Lmh |
| | TDS, mg/L | Hardness | NF | RO | NF | RO |
| 25 | 2918 | 51.1 | 60% | 40% | 14.57 | 14.50 |
| 30 | 2905 | 51.7 | 49% | 51% | 15.76 | 18.50 |

In Exhibit 2, approximately 25% of the NF membranes were removed from service due to lack of need, through the use of automated valve.

Example 2

A system comprised of a treatment block of seawater reverse osmosis membranes and a by-pass stream treatment block of seawater nanofiltration membranes is configured such that the flowrates to each treatment block and the respective high-pressure pump to each block can be regulated. The treatment block is comprised such that it produces approximately 92.8% of the permeate flow using the seawater reverse osmosis membrane block operating at 45% recovery and the remaining permeate flow using a slipstream of permeate from a multi-pass nanofiltration membrane block operating at 75%, 80% and 80% recovery, respectively, for the three-pass system. In this example, the specific (target) salinity (total dissolved solids) of the blended permeate is 2,000 mg/L (+/−50 mg/L) and the maximum allowable calcium is 10 mg/L, the maximum allowable magnesium is 10 mg/L, and the maximum allowable sulfate is 10 mg/L. The operating range of the system is 22 to 31° C.

Exhibit 3 provides the natural deviation of the salinity, calcium, magnesium and sulfate over the temperature range.

| Exhibit 3 | | | | | |
|---|---|---|---|---|---|
| | System with Conventional Operation | | | | Permeate Flow Distribution |
| | TDS, mg/L | $Ca^{2+}$, mg/L | $Mg^{2+}$, mg/L | $SO_4^{2-}$ | SWRO | 3-pass NF |
| 22 | 1872 | 1.0 | 2.8 | 2.3 | 92.9% | 7.1% |
| 25 | 2016 | 1.4 | 3.3 | 2.7 | | |
| 31 | 2183 | 2.0 | 4.6 | 3.7 | | |

The results indicate that the permeate produced at 25° C. meets the permeate water quality specifications but the permeate produced outside this design point does not meet the salinity requirement.

If the high salinity, low hardness, low sulfate slipstream is used to adjust the salinity across the operating seawater temperature range, then the blended permeate salinity can be controlled within the setpoint of 2,000 mg/L, as shown in Exhibit 4.

| Exhibit 4 | | | | | |
|---|---|---|---|---|---|
| | System with Conventional Operation | | | | Permeate Flow Distribution |
| | TDS, mg/L | $Ca^{2+}$, mg/L | $Mg^{2+}$, mg/L | $SO_4^{2-}$ | SWRO | 3-pass NF |
| 22 | 2005 | 1.1 | 2.8 | 2.3 | 92.3% | 7.7% |
| 25 | 2016 | 1.4 | 3.3 | 2.7 | 92.9% | 7.1% |
| 31 | 2017 | 1.9 | 4.6 | 3.8 | 93.6% | 6.4% |

For a 100,000 bbl/day (15,898 m³/day) injection system, the flowrate of the RO system will vary between 92,300 and 93,600 bbl/day (14,674 and 14,481 m³/day) and the NF slipstream requirements will vary between 7,700 and 6,400 bbd/day (1,224 and 1,017 m³/day). The control system will adjust the required flows from the respective systems to meet the conductivity setpoint and any excess water can be disposed to sea (due to its high quality) or alternatively, the production of the two systems can be dialed up or turn as needed, noting the resulting change in flux.

Additionally, while the above embodiments were described as being application for offshore water treatment, one of ordinary skill in the art would appreciate that the treatment techniques may also be used in land-based operations, particularly when the feed water has a high salinity and/or high ionic content.

Furthermore, one skilled in the art in possession of this specification will appreciate that the system and method are also applicable to other water treatment environments. For example, by substituting one or more treatment blocks as appropriate, municipalities could use the system and method to produce portable or otherwise treated water.

Another aspect of the present disclosure is directed to a method for treating water. The method for treating water may include intaking a first amount of water into a plurality of treatment blocks and treating the first amount of water. In one or more embodiments, treating the first amount of water may include pumping at least a portion of the first amount of water through the plurality of treatment blocks. The method may also include outputting aqueous treated water streams from each of the plurality of treatment blocks, separating the aqueous treated water streams from each of the plurality of treatment blocks into aqueous permeate streams and concentrate reject streams, monitoring each of the concentrate and permeate streams, in which the monitoring includes identifying different characteristics of the streams. Further, the method may also include controlling the operation of at least one of the plurality of treatment blocks based on predefined water-characteristic tolerances that fall within a predetermined concentration range based on the different qualities of the streams, outputting a product water stream, and re-treating the product water stream, in which re-treating includes pumping at least a portion of the product water stream through the plurality of treatment blocks. In one or more embodiments, the product water stream may include the permeate stream, the concentrate stream, or a combination of permeate streams and concentrate streams utilizing different membrane products.

Figure 8:
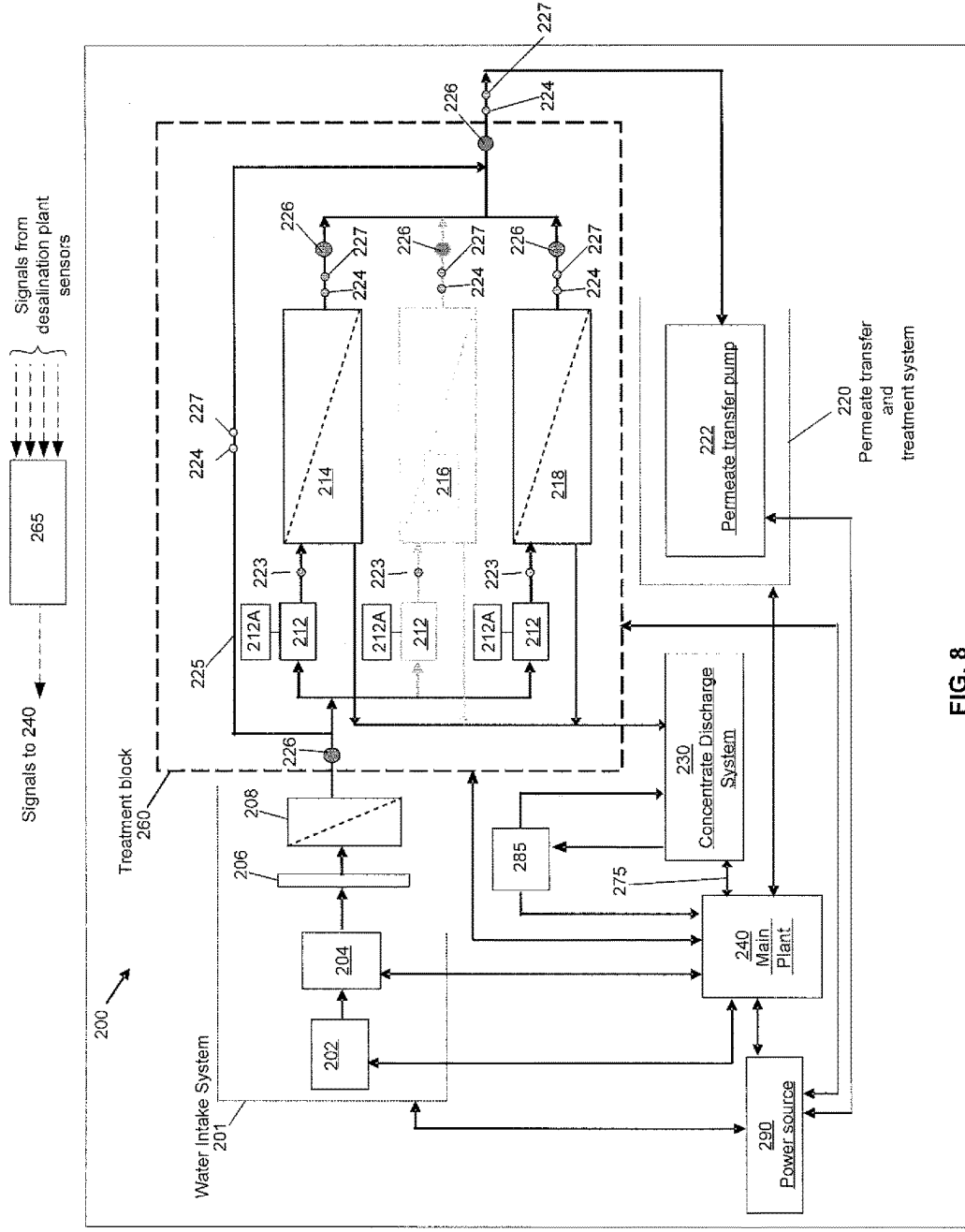
FIG. 8 shows another seawater treatment process according to one or more embodiments of the present invention.

Referring now to FIG. 8, one or more embodiments of the present disclosure are directed to a membrane-based water treatment system 200. In one or more embodiments, the water treatment system may include a water intake system (e.g., the main plant 240) that intakes a first amount of water, a plurality of treatment blocks (214, 216, and 218), which may be arranged in parallel, a concentrate discharge system 230 configured to discharge the concentrate reject stream, and a concentrate re-blending unit 285 and may be configured to monitor the characteristics of a concentrate reject stream and selectively re-blend the concentrate reject stream back through the water intake system. As discussed above, although three membrane pressure vessels are shown, other embodiments may include more or less than three membranes. According to one or more embodiments, each membrane pressure vessel 214, 216, 218, may include a plurality of membrane elements 250 installed therein. Although six elements 250 are shown in each membrane pressure vessel, other embodiments may include more or less than six elements 250.

In one or more embodiments, the plurality of treatment blocks may include a pump 204, a membrane pressure vessel (shown as 214, 216, and 218), a monitor 226, and a controller 265. In one or more embodiments, the pump may feed the first amount of intake water through the membrane pressure vessel, the membrane pressure vessel may include at least one membrane element and separates the first amount of intake water into at least an aqueous permeate stream and a concentrate reject stream. Further, the monitor may be used to identify different characteristics of each of the aqueous permeate streams and the concentrate reject stream, monitor blending of the concentrate reject streams from two or more treatment blocks, and to monitor the blended concentrate reject streams from the two or more treatment blocks based on the identified characteristics and predefined water-characteristic tolerances.

As discussed above, in one or more embodiments, the water treatment system 200 may include a concentrate discharge system 230 configured to discharge the concentrate reject stream. Further, the concentrate re-blending unit 285 may be configured to hold and/or circulate a portion of the concentrate reject stream. Furthermore, as discussed above, the concentrate re-blending unit 285 may be operatively connected to the concentrate discharge system 230 and may include a monitor configured to monitor characteristics of the concentrate reject stream.

Specifically, in one or more embodiments, the concentrate re-blending unit 285 may be configured to monitor one or more characteristics of the concentrate reject stream that has been discharged into the concentrate discharge system 230 and selectively re-blend the concentrate reject stream into the water intake system based on the identified characteristics and predefined water-characteristic tolerances of the concentrate reject stream via a blend line 275 or through the concentrate re-blending unit 285. In one or more embodiments, the blend line 275 may be operatively connected between the concentrate discharge system 230 and the main plant 240. The concentrate discharge system 230 and/or the blend line 275 may include a valve that may allow selective passage of the concentrate reject stream between the concentrate discharge system 230 and the main plant 240.

In one or more embodiments, valves controlling the aqueous permeate streams may be controlled in order to control the output of the concentrate reject stream. In other words, the characteristics and tolerances of the aqueous permeate streams may be monitored and/or manipulated in order to manipulate and/or control the characteristics and tolerances of the concentrate reject stream.

As discussed above, in one or more embodiments, at least one of each of a conductivity sensor 224, a flow sensor 226, and a hardness sensor 227 may be disposed on the blend/bypass line 225. In one or more embodiments, each of the conductivity sensor 224, the flow sensor 226, and the hardness sensor 227 may be disposed on the blend/bypass line 225 to measure conductivity, flow, and hardness of water, respectively, passing through the blend/bypass line 225 on each permeate of the membrane pressure vessel. For example, as shown in FIG. 4A, each of the conductivity sensor 224, the flow sensor 226, and the hardness sensor 227 may be disposed on the blend/bypass line 225 to measure conductivity, flow, and hardness of water, respectively, in the blend/bypass line 225 after the water passes through each membrane pressure vessel 214, 216, 218. Those having ordinary skill in the art will appreciate that each of the conductivity sensor 224, a flow sensor 226, and a hardness sensor 227 may be any conductivity sensor, flow sensor, or hardness sensor known in the art.

Furthermore, in one or more embodiments, the water treatment system 200 may include a desalination water controller 265. In one or more embodiments, the desalination water controller 265 may take signals from desalination plant sensors and output signals to the main plant 240. Further, the controller 265 of the water treatment system 200 may be configured to automatically re-blend the concentrate reject stream into the water intake system based on the identified characteristics and predefined water-characteristic tolerances of the concentrate reject stream via the blend line 275 or through the concentrate re-blending unit 285.

Another aspect of the present disclosure is directed to a method for treating water. The method for treating water may include intaking a first amount of water from a first source into a plurality of treatment blocks, treating the first amount of water, outputting aqueous treated water streams from each of the plurality of treatment blocks, separating the aqueous treated water streams from each of the plurality of treatment blocks into aqueous permeate streams and concentrate reject streams, monitoring each of the aqueous permeate streams, controlling the operation of at least one of the plurality of treatment blocks based on predefined water-characteristic tolerances that fall within a predetermined concentration range based on the different qualities of the aqueous permeate streams, outputting a product water stream into an injection water reservoir or blend point, the product water stream comprising the aqueous permeate stream, intaking a second amount of water from a second source into a produced water reservoir, treating the second amount of water, and discharging the dischargeable water stream. Treating the first amount of water includes pumping at least a portion of the first amount of water through the plurality of treatment blocks. The monitoring includes identifying different characteristics of the aqueous permeate streams. Treating the second amount of water includes combining the second amount of water with the product water stream into a dischargeable water stream in the injection water reservoir or at the blend point.

In one or more embodiments, an external water stream from a downhole reservoir (i.e., produced water) may be circulated, such as during oil recovery applications. According to one or more aspects of the present disclosure, it may be desirable to control, manipulate, or modify the quality (e.g., the water-characteristics) of the produced water to achieve a predetermined water quality (e.g., specific water-characteristics) before re-injecting the produced water into the ground. Those having ordinary skill in the art will appreciate that water quality and water characteristics may include salinity, hardness, turbidity, and/or suspended solids. However, those having ordinary skill in the art will appreciate that any known water characteristic that may be monitored may be considered to be part of the water quality, and that water quality is not limited only to salinity, hardness, turbidity, and suspended solids.

In order to control, manipulate, or modify the quality of the produced water to achieve a predetermined water quality, the produced water from the reservoir may be monitored and blended with another water stream having a specific water quality such that the resulting water stream from the combination (e.g., blending) of the produced water from the reservoir and the other water stream will have the predetermined water quality. In other words, the quality of the produced water may be monitored, and the information about the quality of the produced water may cause a water treatment system to produce another water stream to be combined with the produced water such that the resulting, combined water stream is of a predetermined quality that may be safely re-injected into the ground.

Figure 9:
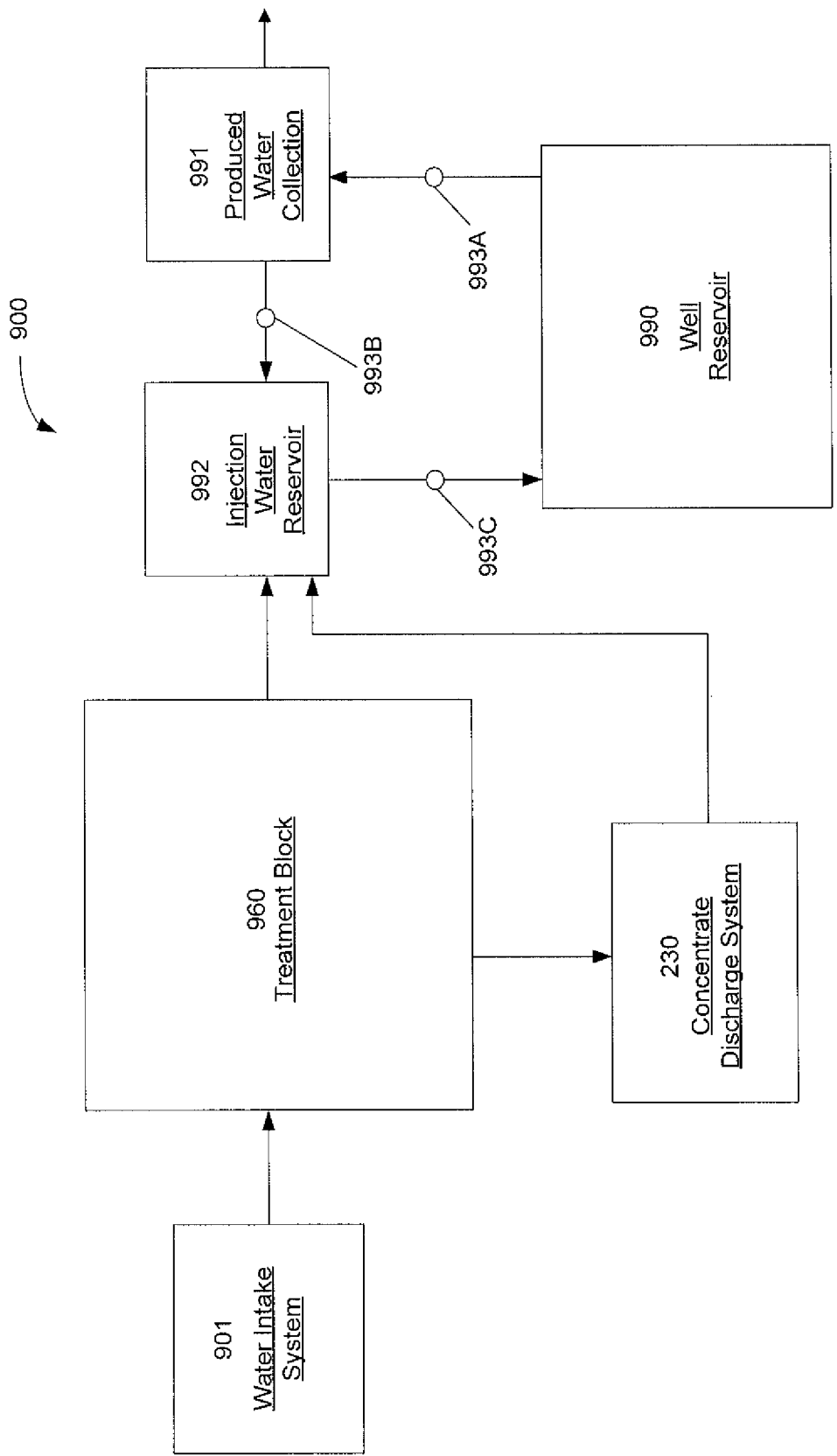
FIG. 9 shows another seawater treatment process according to one or more embodiments of the present invention.

Referring to FIG. 9, seawater treatment system 900 may include a treatment block 960 that may process and treat water from a water intake system 901 and produce a permeate stream and a concentrate stream, or multiple streams. For example, in one or more embodiments, there may be multiple treatment blocks, in which each treatment block has a permeate stream and a concentrate stream. Although not shown, the treatment block 960 may include membrane pressure vessels, valves, and pumps such as shown in the treatment block 260 of FIG. 4A. Similarly, the water intake system 901 may include water intake(s), water intake pump(s), pre-filter(s) such as shown in the water intake system 201 of FIG. 4A.

The permeate stream produced from the treatment block 960 may be a treated water stream, in which intake water was treated in the treatment block 960 to produce a water stream having a predetermined water quality. For example, in one or more embodiments, water taken in by the water intake system 901 may be treated in the treatment block 960 to produce a product water stream having a specific salinity and/or hardness. As discussed above, in one or more embodiments, the product water stream may include the permeate stream, the concentrate stream, or a combination of permeate streams and concentrate streams utilizing different membrane products. For example, in one or more embodiments, the product stream may be the permeate water stream. As shown, the product stream may be discharged from the treatment block 960 into a blending point or an injection water reservoir 992. In one or more embodiments, a valve and/or a flow meter (not shown) may be disposed between the treatment block 960 and the injection water reservoir 992 and may control fluid communication between the treatment block 960 and the injection water reservoir 992. Thus, the valve may control the quantity of the treated product stream discharged into the injection water reservoir 992. The remaining water that was taken into the treatment block 960 but not produced in the permeate stream may be discharged from the treatment block separately in the concentrate stream. As shown, the concentrate stream may be collected into a concentrate discharge system 930.

Further, in one or more embodiments, the seawater treatment system 900 may also intake water from other sources separate from the source(s) from which the water intake system 901 draws water. For example, as shown, water may be separately produced from a well reservoir 990. Those having ordinary skill in the art will appreciate that the well reservoir 990 may represent multiple reservoirs and is not limited to a single well reservoir. This produced water may be drawn into a produced water collection 991.

The produced water may need to be treated before discharging or re-injecting the produced water into the sea or into the ground. For example, in enhanced oilfield applications, an operator may want to re-inject produced water to avoid discharge of the produced water. However, the water quality of the produced water, such as salinity, hardness, turbidity, or other water quality characteristics, may need to be controlled or manipulated before the produced water may be safely re-injected. For example, when produced water is collected on a platform during oil recovery, the produced water may have specialty chemicals added, such as one or more chemicals, polymers, surfactants, etc., to improve oil recovery. Because the produced water may include such specialty chemicals, the operator may not want to discharge the produced water back into the sea or back into the ground. In order to safely discharge the produced water, the water quality of the produced water may be controlled or manipulated, as will be described below. Alternatively or additionally, with the proper control or manipulation of the water quality, the produced water may be rendered appropriate for re-injection.

As the produced water is produced from the well reservoir 990, the produced water may be monitored by a sensor 993A. In one or more embodiments, the sensor 993A may monitor the quantity of produced water as well as the produced water quality (e.g., the water characteristics). For example, the sensor 993A may monitor the salinity and hardness of the produced water from the well reservoir 990. Further, in one or more embodiments, the sensor 993A may monitor the turbidity of the produced water or the suspended solids that may be present in the produced water. In one or more embodiments, the water quality and quantity information of the produced water obtained by the sensor 993A may be transmitted (e.g., by wireless transmission such as radio or any other transmission means known in the art) to an operator or otherwise to the rest of the water treatment system 900. Subsequently, the water intake system 901 and the treatment block 960 may be controlled or manipulated, and the quantity and quality of water taken into the treatment block 960 and discharged from the treatment block 960 as the product stream into the injection water reservoir 992 may be controlled.

The produced water from the produced water collection 991 may be transferred to the blending point or injection water reservoir 992. In one or more embodiments, a valve and/or a flow meter (not shown) may be disposed between the produced water collection 991 and the blending point or injection water reservoir 992 and may control fluid communication between the produced water collection 991 and the blending point or injection water reservoir 992. Thus, the valve may control the quantity of produced water discharged into the well reservoir 990. A sensor 993B may also be disposed between the produced water collection 991 and the injection water reservoir 992 to monitor the quality and quantity of the produced water as the produced water is transferred into the injection water reservoir 992. The information obtained by the sensor 993B may also be transmitted to an operator of the water treatment system 900. Also, if the produced water has an appropriate quality for discharge, the produced water may be discharged from the produced water collection 991.

Subsequently, calculations may be made in view of the information about the produced water obtained by the sensors 993A, 993B, and the water intake system 901 and treatment block 960 may react, or be controlled or manipulated, to produce water in the product stream in a specific quantity and water quality such that combining the product stream with the produced water in the injection water reservoir 992 results in a dischargeable water stream of a predetermined water quality. In other words, a specific quantity and quality of treated water through the treatment block 960 may be treated and combined or blended with the produced water based on the quantity and quality of the produced water in order to produce a dischargeable water stream of a predetermined water quality.

For example, in one or more embodiments, the sensor 993A, 993B may monitor and transmit the quantity, as well as the hardness and/or salinity of the produced water produced from the well reservoir 990. The operator or the treatment system 900 may then use this information to calculate how much hardness or salinity may need to be produced in the water from the treatment block 960 (i.e., how much hardness, salinity, turbidity, etc. may need to be in the product stream) such that when the produced water is combined with the product stream, a dischargeable water stream of desirable quality is formed and may be re-injected into the well reservoir 990 or discharged into the sea or into the ground.

In one or more embodiments, as the dischargeable water stream (which may be a combination of the produced water and the product stream is re-injected into the well-reservoir 990, a sensor 993C disposed between the injection water reservoir 992 and the well reservoir 990 may ensure that the proper water quality is monitored. The sensor 993C may allow an operator or the water treatment system to monitor the quantity and quality of the dischargeable water stream as the dischargeable water stream is re-injected into the well reservoir 990.

Advantageously, one or more embodiments may provide one or more of the following. In offshore operations, the most common source of injection water is seawater, which has significant levels of contaminants that may be removed before the seawater can be used as an injection water. Depending on the type of formation being drilled, certain components of the seawater must be removed while others must remain in order to protect the formation from damage and to maximize the hydrocarbons produced from the formation. Using a combination of water treatment approaches may allow for water treatment processes which are able to effectively and cost efficiently prepare injection water that is specifically tailored for the formation being drilled and thereby allows for improved oil recovery. Further, water quality and specific water-characteristics can be closely controlled to ensure maximum effectiveness in varying downhole environments. Also, the water treatment processes may be used to reduce costs associated with the preparation of injection water because the most expensive component, i.e., the high-pressure pump, can be operated at variable pressures using information from the permeate streams and output streams.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for treating water, comprising:
   intaking a first amount of water into a first plurality of treatment blocks, the first plurality of treatment blocks comprising: one or more reverse osmosis treatment blocks, one or more nanofiltration treatment blocks, both a controllable, variable speed, high-pressure pump, and a controllable valve associated with each treatment block of the first plurality of treatment blocks,
   wherein the one or more nanofiltration treatment blocks are in parallel with the one or more reverse osmosis treatment blocks;
   intaking a second amount of water into a blend line that bypasses the first plurality of treatment blocks;
   pre-treating at least the first amount of water using at least one of a filter and a first specially-treated water;
   treating the first amount of water, wherein treating the first amount of water comprises:
      pumping a first portion of the first amount of water through the one or more reverse osmosis treatment blocks of the first plurality of treatment blocks, separating the first portion into a first aqueous stream comprising a first permeate and a second aqueous stream comprising a first concentrate, wherein the first aqueous stream is reduced in monovalent and divalent ions and the second aqueous stream is enriched in monovalent and divalent ions, and
      pumping a second portion of the first amount of water through the one or more nanofiltration treatment blocks of the first plurality of treatment blocks, in parallel with the one or more reverse osmosis treatment blocks, separating the second portion into a third aqueous stream comprising a second permeate and a fourth aqueous stream comprising a second concentrate, wherein the third aqueous stream is reduced in divalent ions and reduced in monovalent ions, while the fourth aqueous stream is enriched in divalent ions and enriched in monovalent ions;
   monitoring each of the first, second, third, and fourth aqueous streams and the fluid from the blend line, wherein the monitoring comprises identifying all of flow rate, conductivity, turbidity, and concentrations of one or more divalent ions for each of the first, second, third, and fourth aqueous streams and the fluid from the blend line;
   controlling an operation of at least one of the first plurality of treatment blocks, by controlling the controllable, variable speed, high-pressure pump, and the controllable valve associated with the at least one of the first plurality of treatment blocks, as a function of pre-defined water-characteristic tolerances that fall within a predetermined concentration range, wherein controlling comprises modifying at least one of flow rate, pressure, membrane flux, fraction of membranes used, recovery percentage, water pH, and water temperature, and wherein controlling is capable of modifying all of flow rate, pressure, membrane flux, fraction of membranes used, recovery percentage, water pH, and water temperature;

combining at least two of the first, second, third, and fourth aqueous streams, a second specially-treated water stream, and the fluid from the blend line at a blend point to form a product water stream based on predetermined characteristics of the first, second, third, and fourth aqueous streams, the second specially-treated water stream and the fluid from the blend line and the predefined water-characteristic tolerances;

outputting the product water stream comprising the combined aqueous streams, wherein the product water stream maintains the predefined water-characteristic tolerances within a predetermined concentration range, wherein the second amount of water is a produced water from an oil field recovery operation.

2. The method of claim 1, wherein one or more of the predefined water-characteristic tolerances fall within a concentration variation of +/−100 mg/L.

3. The method of claim 1, further comprising:
feeding one or more of the first, second, third, or fourth aqueous streams back into one or more of the first plurality of treatment blocks.

4. The method of claim 1, further comprising:
mixing a third specially-treated water into the product water stream.

5. The method of claim 1, wherein the method is capable of producing at least 100,000 bbl/day of product water.

6. A method for treating water, comprising:
intaking a first amount of water into a first plurality of treatment blocks, the first plurality of treatment blocks comprising: one or more reverse osmosis treatment blocks, one or more nanofiltration treatment blocks, both a controllable, variable speed, high-pressure pump, and a controllable valve associated with each treatment block of the first plurality of treatment blocks, wherein the one or more nanofiltration treatment blocks are in parallel with the one or more reverse osmosis treatment blocks;

intaking a second amount of water into a blend line that bypasses the first plurality of treatment blocks;

pre-treating at least the first amount of water using at least one of a filter and a first specially-treated water;

treating the first amount of water, wherein treating the first amount of water comprises:
pumping a first portion of the first amount of water through the one or more reverse osmosis treatment blocks of the first plurality of treatment blocks, separating the first portion into a first aqueous stream comprising a first permeate and a second aqueous stream comprising a first concentrate, wherein the first aqueous stream is reduced in monovalent and divalent ions and the second aqueous stream is enriched in monovalent and divalent ions, and pumping a second portion of the first amount of water through the one or more nanofiltration treatment blocks of the first plurality of treatment blocks, in parallel with the one or more reverse osmosis treatment blocks, separating the second portion into a third aqueous stream comprising a second permeate and a fourth aqueous stream comprising a second concentrate, wherein the third aqueous stream is reduced in divalent ions and reduced in monovalent ions, while the fourth aqueous stream is enriched in divalent ions and enriched in monovalent ions;

monitoring each of the first, second, third, and fourth aqueous streams and the fluid from the blend line, wherein the monitoring comprises identifying all of flow rate, conductivity, turbidity, and concentrations of one or more divalent ions for each of the first, second, third, and fourth aqueous streams and the fluid from the blend line;

controlling an operation of at least one of the first plurality of treatment blocks, by controlling the controllable, variable speed, high-pressure pump, and the controllable valve associated with the at least one of the first plurality of treatment blocks, as a function of predefined water-characteristic tolerances that fall within a predetermined concentration range, wherein the method controls all of flow rate, pressure, membrane flux, fraction of membranes used, recovery percentage, water pH, and water temperature;

combining at least two of the first, second, third, and fourth aqueous streams, a second specially-treated water stream, and the fluid from the blend line at a blend point to form a product water stream based on predetermined characteristics of the first, second, third, and fourth aqueous streams, the second specially-treated water stream and the fluid from the blend line and the predefined water-characteristic tolerances;

outputting the product water stream comprising the combined aqueous streams, wherein the product water stream maintains the predefined water-characteristic tolerances within a predetermined concentration range, wherein the second amount of water is a produced water from an oil field recovery operation.

7. The method of claim 6, wherein one or more of the predefined water-characteristic tolerances fall within a concentration variation of +/−100 mg/L.

8. The method of claim 6, further comprising:
feeding one or more of the first, second, third, or fourth aqueous streams back into one or more of the first plurality of treatment blocks.

9. The method of claim 6, further comprising:
mixing a third specially-treated water into the product water stream.

10. The method of claim 6, wherein the method is capable of producing at least 100,000 bbl/day of product water.

11. A method for treating water, comprising:
intaking a first amount of water into a first plurality of treatment blocks, the first plurality of treatment blocks comprising: one or more reverse osmosis treatment blocks, one or more nanofiltration treatment blocks, both a controllable, variable speed, high-pressure pump, and a controllable valve associated with each treatment block of the first plurality of treatment blocks, wherein the one or more nanofiltration treatment blocks are in parallel with the one or more reverse osmosis treatment blocks;

intaking a second amount of water into a blend line that bypasses the first plurality of treatment blocks;

pre-treating at least the first amount of water using at least one of a filter and a first specially-treated water;

treating the first amount of water, wherein treating the first amount of water comprises:
pumping a first portion of the first amount of water through the one or more reverse osmosis treatment blocks of the first plurality of treatment blocks, separating the first portion into a first aqueous stream comprising a first permeate and a second aqueous stream comprising a first concentrate, wherein the first aqueous stream is reduced in monovalent and divalent ions and the second aqueous stream is enriched in monovalent and divalent ions, and pumping a second portion of the first amount of water through the one or more nanofiltration treatment blocks of the first plurality of treatment blocks, in parallel with the one or more reverse osmosis treatment blocks, separating the second portion into a third aqueous stream comprising a second permeate and a fourth aqueous stream comprising a second concentrate, wherein the third aqueous stream is reduced in divalent ions and reduced in monovalent ions, while the fourth aqueous stream is enriched in divalent ions and enriched in monovalent ions;

monitoring each of the first, second, third, and fourth aqueous streams and the fluid from the blend line, wherein the monitoring comprises identifying at least one from a group consisting of flow rate, conductivity, turbidity, and concentrations of one or more divalent ions for each of the first, second, third, and fourth aqueous streams and the fluid from the blend line wherein the monitoring is capable of identifying all of flow rate, conductivity, turbidity, and concentrations of one or more divalent ions for each of the first, second, third, and fourth aqueous streams and the fluid from the blend line;

controlling an operation of at least one of the first plurality of treatment blocks, by controlling the controllable, variable speed, high-pressure pump, and the controllable valve associated with the at least one of the first plurality of treatment blocks, as a function of predefined water-characteristic tolerances that fall within a predetermined concentration range, wherein the method controls all of flow rate, pressure, membrane flux, fraction of membranes used, recovery percentage, water pH, and water temperature;

combining at least two of the first, second, third, and fourth aqueous streams, a second specially-treated water stream, and the fluid from the blend line at a blend point to form a product water stream based on predetermined characteristics of the first, second, third, and fourth aqueous streams, the second specially-treated water stream and the fluid from the blend line and the predefined water-characteristic tolerances;

outputting the product water stream comprising the combined aqueous streams, wherein the product water stream maintains the predefined water-characteristic tolerances within a predetermined concentration range, wherein the second amount of water is a produced water from an oil field recovery operation.

12. The method of claim 11, wherein one or more of the predefined water-characteristic tolerances fall within a concentration variation of +/−100 mg/L.

13. The method of claim 11, further comprising:
feeding one or more of the first, second, third, or fourth aqueous streams back into one or more of the first plurality of treatment blocks.

14. The method of claim 11, further comprising:
mixing a third specially-treated water into the product water stream.

15. The method of claim 11, wherein the method is capable of producing at least 100,000 bbl/day of product water.

* * * * *